United States Patent
Liu et al.

(10) Patent No.: US 11,740,122 B2
(45) Date of Patent: Aug. 29, 2023

(54) AUTONOMOUS DISCRIMINATION OF OPERATION VIBRATION SIGNALS

(71) Applicant: ORACLE INTERNATIONAL CORPORATION, Redwood Shores, CA (US)

(72) Inventors: Yixiu Liu, Rowland Heights, CA (US); Matthew T. Gerdes, Oakland, CA (US); Guang C. Wang, San Diego, CA (US); Kenny C. Gross, Escondido, CA (US); Hariharan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/506,200

(22) Filed: Oct. 20, 2021

(65) Prior Publication Data
US 2023/0121897 A1 Apr. 20, 2023

(51) Int. Cl.
*G01H 1/00* (2006.01)
*G06N 20/00* (2019.01)
(Continued)

(52) U.S. Cl.
CPC .............. *G01H 1/003* (2013.01); *G01H 17/00* (2013.01); *G06N 20/00* (2019.01); *G01M 15/12* (2013.01)

(58) Field of Classification Search
CPC ........ G01H 1/003; G01H 17/00; G06N 20/00; G01M 15/12
See application file for complete search history.

(56) References Cited

U.S. PATENT DOCUMENTS 3,705,516 A 12/1972 Reis
5,684,718 A * 11/1997 Jenkins ................ G01H 1/003
702/56
(Continued)

FOREIGN PATENT DOCUMENTS

CN 102072829 A 5/2011
CN 107181543 A1 9/2017
(Continued)

OTHER PUBLICATIONS

Whisnant et al.; "Proactive Fault Monitoring in Enterprise Servers," 2005 IEEE International Multiconference in Computer Science & Computer Engineering, Las Vegas, NV, Jun. 27-30, 2005, pp. 1-11.
(Continued)

*Primary Examiner* — Aditya S Bhat
(74) *Attorney, Agent, or Firm* — Kraguljac Law Group, LLC

(57) ABSTRACT

Systems, methods, and other embodiments associated with autonomous discrimination of operation vibration signals are described herein. In one embodiment, a method includes partitioning a frequency spectrum of output into a plurality of discrete bins, wherein the output is collected from vibration sensors monitoring a reference device; generating a representative time series signal for each bin while the device is operated in a deterministic stress load; generating a PSD for each bin by converting each signal from the time domain to the frequency domain; determining a maximum power spectral density value and a peak frequency value for each bin; selecting a subset of the bins that have maximum PSD values exceeding a threshold; assigning the representative time series signals from the selected subset of bins as operation vibration signals indicative of operational load on the reference device; and configuring a machine learning model based on at least the operation vibration signals.

20 Claims, 13 Drawing Sheets

(51) Int. Cl.
*G01H 17/00* (2006.01)
*G01M 15/12* (2006.01)

(56) References Cited

U.S. PATENT DOCUMENTS

| | | | |
|---|---|---|---|
| 7,020,802 B2 | 3/2006 | Gross et al. | |
| 7,281,112 B1 | 10/2007 | Gross et al. | |
| 7,613,576 B2 | 11/2009 | Gross et al. | |
| 7,613,580 B2 | 11/2009 | Gross et al. | |
| 7,702,485 B2 | 4/2010 | Gross et al. | |
| 7,703,325 B2 * | 4/2010 | Wu | C21D 10/00 |
| | | | 148/558 |
| 7,869,977 B2 | 1/2011 | Lewis et al. | |
| 8,055,594 B2 | 11/2011 | Dhanekula et al. | |
| 8,069,490 B2 | 11/2011 | Gross et al. | |
| 8,200,991 B2 | 6/2012 | Vaidyanathan et al. | |
| 8,275,738 B2 | 9/2012 | Gross et al. | |
| 8,341,759 B2 | 12/2012 | Gross et al. | |
| 8,457,913 B2 | 6/2013 | Zwinger et al. | |
| 8,543,346 B2 | 9/2013 | Gross et al. | |
| 9,933,338 B2 | 4/2018 | Noda et al. | |
| 10,149,169 B1 | 12/2018 | Keller | |
| 10,452,510 B2 | 10/2019 | Gross et al. | |
| 10,496,084 B2 | 12/2019 | Li et al. | |
| 11,055,396 B2 | 7/2021 | Gross et al. | |
| 2004/0054281 A1 * | 3/2004 | Adam | G06T 5/003 |
| | | | 600/437 |
| 2008/0140362 A1 | 6/2008 | Gross et al. | |
| 2008/0252309 A1 | 10/2008 | Gross et al. | |
| 2008/0252441 A1 | 10/2008 | McElfresh et al. | |
| 2008/0256398 A1 | 10/2008 | Gross et al. | |
| 2009/0099830 A1 | 4/2009 | Gross et al. | |
| 2009/0125467 A1 | 5/2009 | Dhanekula et al. | |
| 2009/0306920 A1 | 12/2009 | Zwinger et al. | |
| 2010/0023282 A1 | 1/2010 | Lewis et al. | |
| 2010/0033386 A1 | 2/2010 | Lewis et al. | |
| 2010/0161525 A1 | 6/2010 | Gross et al. | |
| 2010/0305892 A1 | 12/2010 | Gross et al. | |
| 2010/0306165 A1 | 12/2010 | Gross et al. | |
| 2012/0030775 A1 | 2/2012 | Gross et al. | |
| 2012/0111115 A1 * | 5/2012 | Ume | G01N 29/449 |
| | | | 73/588 |
| 2013/0157683 A1 | 6/2013 | Lymberopoulos et al. | |
| 2015/0137830 A1 | 5/2015 | Keller, III et al. | |
| 2016/0098561 A1 | 4/2016 | Keller et al. | |
| 2016/0258378 A1 | 9/2016 | Bizub et al. | |
| 2017/0163669 A1 | 6/2017 | Brown et al. | |
| 2017/0301207 A1 * | 10/2017 | Davis | G01H 1/08 |
| 2018/0011130 A1 | 1/2018 | Aguayo Gonzalez et al. | |
| 2018/0060203 A1 | 3/2018 | Gupta et al. | |
| 2018/0276044 A1 | 9/2018 | Fong et al. | |
| 2018/0349797 A1 | 12/2018 | Garvey et al. | |
| 2019/0064034 A1 | 2/2019 | Fayfield et al. | |
| 2019/0102718 A1 | 4/2019 | Agrawal | |
| 2019/0163719 A1 | 5/2019 | Gross et al. | |
| 2019/0196892 A1 | 6/2019 | Matei et al. | |
| 2019/0197145 A1 | 6/2019 | Gross et al. | |
| 2019/0237997 A1 | 8/2019 | Tsujii et al. | |
| 2019/0243799 A1 | 8/2019 | Gross et al. | |
| 2019/0286725 A1 | 9/2019 | Gawlick et al. | |
| 2019/0378022 A1 | 12/2019 | Wang et al. | |
| 2020/0191643 A1 * | 6/2020 | Davis | G01H 1/00 |
| 2020/0201950 A1 | 6/2020 | Wang et al. | |
| 2020/0242471 A1 * | 7/2020 | Busch | G06K 9/6256 |
| 2020/0387753 A1 | 12/2020 | Brill et al. | |
| 2021/0081573 A1 | 3/2021 | Gross et al. | |
| 2021/0158202 A1 | 5/2021 | Backlawski et al. | |
| 2021/0174248 A1 | 6/2021 | Wetherbee et al. | |
| 2021/0270884 A1 | 9/2021 | Wetherbee et al. | |

FOREIGN PATENT DOCUMENTS

| | | | | |
|---|---|---|---|---|
| CN | 108344564 A | | 7/2018 | |
| CN | 110941020 A1 | | 3/2020 | |
| DE | 4447288 A1 * | | 7/1995 | G05B 19/4184 |
| DE | 60017609 T2 * | | 10/2005 | G01M 7/00 |
| DE | 102018207176 A1 * | | 11/2019 | |
| KR | 20210082971 A * | | 9/2022 | |
| WO | WO-2017187333 A1 * | | 11/2017 | G01H 1/006 |
| WO | 2020/215116 A1 | | 10/2020 | |
| WO | WO-2021166128 A1 * | | 8/2021 | |

OTHER PUBLICATIONS

United States Nuclear Regulatory Commission; Technical Review of On-Line Monitoring Techniques for Performance Assessment, vol. 1; NUREG/CR-6895; Jan. 31, 2006, pp. 1-132.

Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Gross, Kenny, Oracle Labs; MSET2 Overview: "Anomaly Detection and Prediction" Oracle Cloud Autonomous Prognostics; p. 1-58; Aug. 8, 2019.

Guo, "Implementation of 3D kiviat diagrams." (2008) Year: 2008 pp. 1-37.

Abran et al., "Estimation models based on functional profiles" Intl. Workshop on Software Measurement—IWSM/MetriKon, Kronisburg (Germany) Shaker Verlag. 2004 (Year: 2004).

Wang et al., Process Fault Detection Using Time-Explicit Kiviat Diagrams:, AL CHE Journal 61.12 (2015): 4277-4293).

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Gross, K. C. et al., "Application of a Model-Based Fault Detection System to Nuclear Plant Signals," downloaded from https://www.researchgate.net/publication/236463759; Conference Paper: May 1, 1997, 5 pages.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Patent Cooperation Treaty (PCT), International Search Report and Written Opinion issued in PCT International Application No. PCT/US2020/060083 dated Mar. 19, 2021 (13 pgs).

Patent Cooperation Treaty (PCT), International Search Report and Written Opinion issued in PCT International Application No. PCT/US2021/015802 dated May 28, 2021 (13 pgs).

Patent Cooperation Treaty (PCT), International Search Report and Written Opinion issued in PCT International Application No. PCT/US2021/013633 dated May 6, 2021 (10 pgs).

Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Patent Cooperation Treaty (PCT), International Search Report and Written Opinion issued in PCT International Application No. PCT/US2021/014106 dated Apr. 26, 2021 (9 pgs).

Patent Cooperation Treaty (PCT), International Search Report and Written Opinion issued in PCT International Application No. PCT/US2021/015359 dated Apr. 9, 2021 (34 pgs).

United States Patent and Trademark Office, Non-Final Office Action issued in U.S. Appl. No. 16/820,807 dated May 21, 2021 (36 pgs).

(56) References Cited

OTHER PUBLICATIONS

Wald, A, "Sequential Probability Ratio Test for Reliability Demonstration", John Wiley & Sons, 1947.
Patent Cooperation Treaty (PCT), International Search Report and Written Opinion issued in PCT International Application No. PCT/US2021/062380 dated May 24, 2022 (10 pgs).
Patent Cooperation Treaty (PCT), International Search Report and Written Opinion issued in PCT International Application No. PCT/US2022/046142 dated Jan. 27, 2023 (12 pgs).
Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.

* cited by examiner

AUTONOMOUS DISCRIMINATION OF OPERATION VIBRATION SIGNALS

BACKGROUND

Accelerometers (vibration sensors) may be affixed to mechanical devices and used to detect problems in the devices that result in higher vibration levels, which can be precursors to failure. Present techniques for vibration-based condition monitoring of mechanical devices are rudimentary. For example, one approach for deriving diagnostic and prognostic information from accelerometer sensors is to place thresholds on the gross vibration levels, so that if the vibrations increase above the threshold, an alarm condition is actuated to raise a prognostic warning.

Thresholds on vibration amplitudes are most appropriate for machines that have a constant load and run at a fixed speed for the life of the system, and for constant-load machines that happen to be in an environment with a stationary ambient vibration level, that is, where there are no other vibrating components that may provide a variable ambient vibration level. But, fixed workload components that run at fixed rotations per minute (RPMs) for life and are not mechanically coupled to any other components that add to the ambient vibration background are very rare. For rotating machinery with dynamic (that is, changing over time) workloads, variable-speed performance, and mounted into structures containing other varying vibration sources, thresholds on gross vibrational amplitudes are very inefficient for detecting the early onset of degradation. The inefficiencies are a consequence of the threshold boundaries. Threshold alarm boundaries have to be set higher than the highest peak for the component at its highest load, highest RPM setting, and when the ambient vibration levels are highest. This significantly lowers the early warning potential for prognostics because vibration due to incipient failure may not reach the threshold until significant degradation has occurred, and may never reach the threshold at all before total failure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that provide autonomous discrimination of operation vibration signals. In one embodiment, the systems and methods described herein provide vibration resonance spectrometry (VRS)-based autonomous discrimination of mechanical device operation signatures for condition-based health monitoring of the mechanical device. In one embodiment, the systems and methods described herein implement a frequency-domain to time-domain to frequency-domain double transformation that parses out those vibration measurements of a device that are most indicative of the current operational state of the device. This novel approach identifies the most valuable narrow frequency bins for prognostic surveillance machine learning tools to monitor for continuous assessment of the health of the device. The systems and methods described herein for autonomous discrimination of operation vibration signals enables all types of high-frequency sensors to be consumed and analyzed in real-time by prognostic machine learning algorithms for proactive early and accurate incipient fault detection.

—Vibration Monitoring—

Vibration-based condition monitoring to detect abnormal changes in detected vibration of a device (referred to herein as "vibration monitoring") is a tool to detect degrading operations of devices with rotating components. Such devices can be simple to complex, ranging for example from impeller pumps to vehicles to enterprise computer servers.

Figure 1:
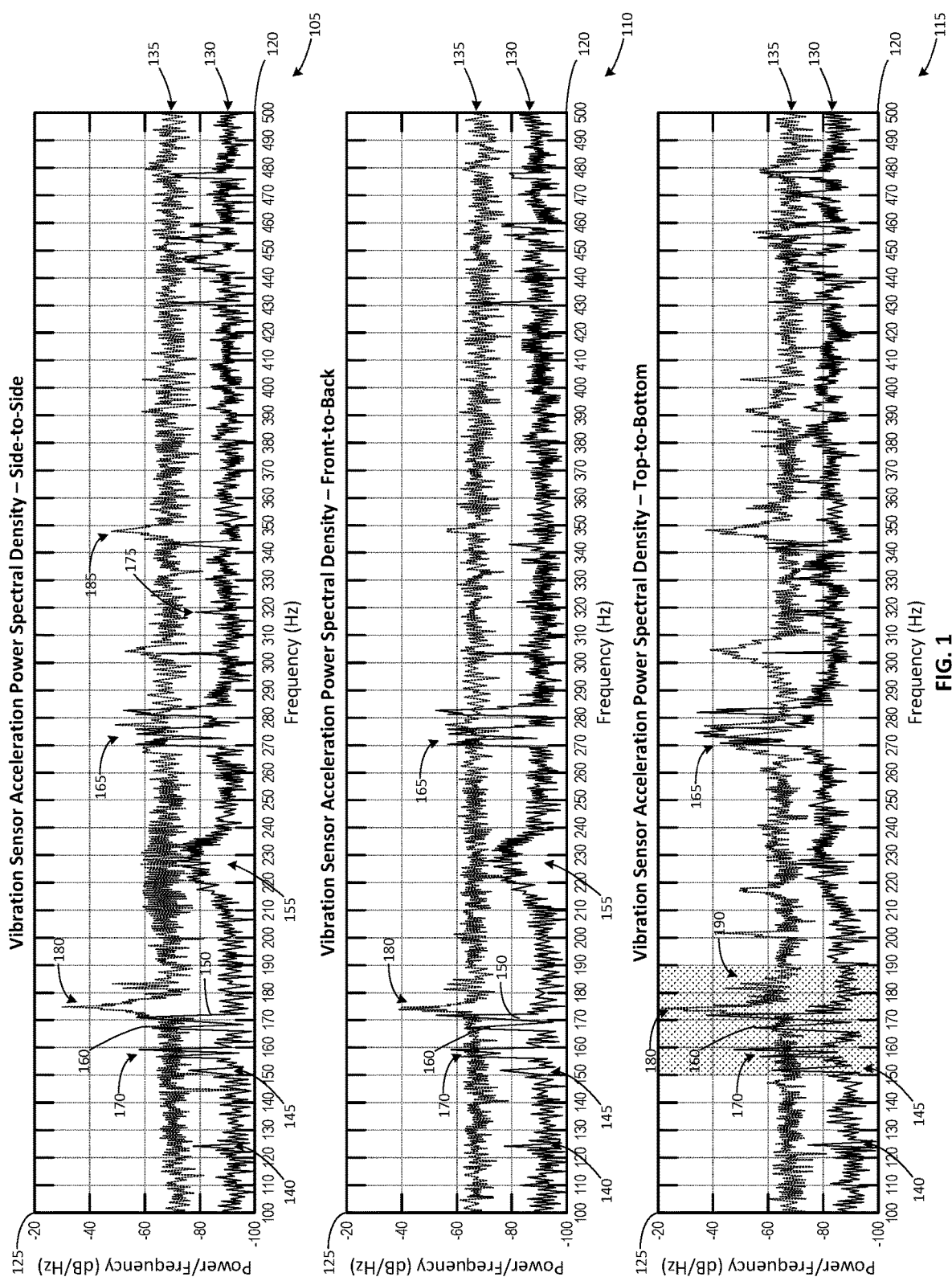
FIG. 1 illustrates example power spectral density spectrograms along three axes showing vibration features for an example large enterprise server device.

FIG. 1 illustrates example power spectral density (PSD) spectrograms 105, 110, 115 along three axes showing vibration features for an example large enterprise server device. PSD describes power present in a signal as a function of frequency. The example enterprise server includes multiple internal rotating components, such as main fans, power-supply-unit internal fans, and Hard Disk Drive (HDD) spindle motors. Spectrogram 105 shows vibration sensor acceleration power spectral density for side-to-side (lateral) acceleration. Spectrogram 110 shows vibration sensor acceleration power spectral density for front-to-back (longitudinal) acceleration. Spectrogram 115 shows vibration sensor acceleration power spectral density for top-to-bottom (vertical) acceleration. The power spectral density in each spectrogram is plotted against a frequency axis 120 measured in Hertz (Hz) and a power per frequency axis 125 measures in decibels per Hertz (db/Hz). In each spectrogram 105, 110, 115, power spectral density for the enterprise server with normal, undegraded components are shown by a solid line 130, and power spectral density for the enterprise server with degraded, failing fans installed is represented by a dotted line 135.

Vibration PSD peaks at approximately 125 Hz 140, 150 Hz 145, 170 Hz 150, and 225 Hz 155 are caused by operation of the main fans of the enterprise server. A vibration PSD peak at approximately 167 Hz 160 is caused by operation of HDDs of the enterprise server. Vibration PSD peaks at approximately 270, 275, and 280 Hz 165 are caused by operation of central processing unit (CPU) fans. A vibration PSD peak at approximately 160 Hz 170 is a first harmonic of a good (correctly functioning) power supply fan. A small vibration PSD peak at approximately 315 Hz 175 is a second harmonic of a good power supply fan. A vibration PSD peak at approximately 175 Hz 180 is a first harmonic of a bad (incorrectly functioning or failing) power supply fan. A vibration PSD peak at approximately 345 Hz 185 is a second harmonic of a good power supply fan. The Area under the PSD curve in the vicinity of a fundamental or harmonic peak can be indicative of the condition of the component causing the peak. For example, the area under the PSD curve in the vicinity of the first harmonics of the power supply fan (indicated by shaded region 190) is an indicator of the power supply fan condition.

Peaks in the PSD are dominated by dynamic and cyclic motion such as the rotation frequencies of internal rotating components, such as fans, blowers, turbines, motors, generators, any mechanical components with rotating shafts. Even for hydraulic systems with flow driven by centrifugal pumps, there are periodicities from the vane-passing frequencies that appear in the flow signatures and delta-pressure transducers. In all of the foregoing phenomena, the peaks that appear in the PSDs correspond to the 1×, 2×, 3× and higher harmonics of the fundamental periodicities of the rotating components. As can be seen in the PSD spectrograms 105, 110, and 115, all of the significant peaks are associated with rotating components, either as fundamental vibration or higher harmonics. Note that the dB scale is a log scale, so a peak-to-base ratio of 10 dB is actually a factor of 100 higher at the tip of the peak vs the base vibration level.

One approach to vibration monitoring is to analyze the outputs from vibration sensors, perform a Fast Fourier Transform (FFT) to identify the peaks in the power spectral density (PSD) for the device, then monitor those peaks to detect changes. For example, the vibrational surveillance may focus on the highest peaks in the PSDs apply a threshold to the height (amplitudes) of the peaks to detect changes in amplitude of the vibration, and/or the centerline frequency of the peaks to detect changes in the speed of the vibration.

Monitoring the height of the peaks in the PSD to detect excessive vibration is subject to fundamental limitations that significantly reduce the ability to catch small incipient defects so that those small problems can be proactively remediated before they progress into serious and/or expensive outage events. If the device always operates at one uniform performance level with fixed-speed rotating components, and the device is in an environment with fixed (unchanging) ambient vibrations, then detecting a change in the height of a PSD peak can be valuable. Where an engine, motor, generator, or any rotating machinery starts to vibrate with a significantly increased amplitudes, it is an indication that a mechanical problem is underway. Such use cases of always-uniform duty cycle operation are exceedingly rare. For devices where performance and/or load on the device may vary between low/off and high/maximum utilization states, the peaks in the PSD spectrum change with workload. Here, vibration anomaly detection that monitors PSD peak height is limited by establishment of the alert threshold higher than the maximum operational performance in conditions involving peak ambient vibration levels. This maximum vibration may constitute just a few percent of the operation time for that asset. For all operation at non-maximum workload and with non-maximum ambient vibration levels, this approach is very insensitive to catching the incipience or onset of subtle new degradation modes.

A drawback to monitoring the height of the peaks in the PSDs to detect excessive vibration, especially for devices for which the load may change while the device is operated, is that the problem has to be quite severe before any alarm is issued. For example, where a threshold is placed just above the highest peak on the PSD curve for the enterprise server with normal, undegraded components 130, degradation of just one rotating component inside the enterprise server box might have to get quite severe before it crosses that high threshold to trigger an alert.

Monitoring the centerline frequencies of the peaks to detect a change in frequency is generally limited to fixed-speed assets. For those limited use cases, detecting a change in centerline peak frequency can indicate an increase in friction (for example, lubrication dryout or bearing-out-of-roundness or some bowing of a shaft, or problem in the up-stream motor that is supposed to be rotating a shaft or other element at an exact number of rotations per minute (RPMs)).

The balance to be struck between catching incipient degradation mechanisms and causing false alarms when monitoring amplitudes or centerlines of the peaks presents a significant challenge because, where thresholds are placed on PSD peak heights or centerline changes, if one wants to get higher sensitivity for earlier warnings of developing degradation mode then designers must lower the thresholds. However, with variable performance assets and especially with variability in ambient vibration levels, lowering the thresholds results in spurious alarms that have no structural safety significance at all. False alarms from spurious trips of thresholds can be extremely costly, because the false alarms result in taking revenue-generating assets out of service unnecessarily. So to avoid the costly false alarms, designers raise the alarm thresholds on peak frequencies, and then if there is a new degradation mode, the degradation has to be more severely underway (or the machine already nonfunctional) before any alarm is issued.

—Overview of Autonomous Discrimination of Vibration Signals—

Monitoring the output of an accelerometer affixed to any generic mechanical or fluid-flow device or system reveals that, if one stresses the system (by increasing the load on the system, or the velocity of the fluid, or the rotational speed of rotating elements), some vibration frequencies are very strongly associated with the demand profile for the device or system being monitored while other frequencies are just random noise or ambient vibrational content from outside the device. These frequencies that most closely reflect the demand on the device may be referred to as operation vibration signals.

The systems and methods described herein that provide autonomous discrimination of operation vibration signals introduce a new approach to vibration monitoring that is radically different from the PSD peak height and peak centerline monitoring approaches discussed above. The systems and methods for autonomous discrimination of operation vibration signals apply a novel frequency-domain to time-domain to frequency-domain double transformation that can autonomously and quickly isolate operation vibration signals from among the random noise and ambient vibration, thereby enabling the application of prognostic machine learning to the myriad of devices and engineering systems now using accelerometers for fault detection.

In one embodiment, a finite number of optimal or best narrow-band frequency bins are selected from the frequency spectrum and represented by time series signals of regular (that is, equally spaced in time) observations of the frequency bin in an initial frequency-domain to time-domain transformation. The workload of the device being monitored is varied in an oscillating pattern or "wiggled" with a regular period while the observations of the bins are taken to create the time series signals for each bin. Then, a Fourier transform is performed on the time series for each bin to create an individual PSD for the bin, placing the vibration information back into the frequency domain, and revealing the periodic changes within the bins. The highest PSD spikes in those bins show the signals that most closely couple the mechanical condition of the device with vibrational measurements, and are the signals to provide to subsequent machine learning analysis (either training or surveillance).

This frequency-domain to time-domain to frequency-domain double transformation provides autonomous identification and extraction of those vibration frequencies that are most indicative of the current operational state of a device, enabling real-time monitoring of those frequencies in the time domain with machine learning models to detect anomalous performance degradation and incipient failure much earlier and with higher prognostic accuracy than is available with other vibration monitoring techniques. Such frequency identification is distinct from and superior to those vibration analyses that simply transform to raw accelerometer signals to the frequency domain (for example by applying a Fourier transform to the accelerometer signals), which detects incipient failure much later (if at all) and with low prognostic accuracy.

The systems and methods for autonomous discrimination of operation vibration signals thus transform time-domain raw accelerometer readings to frequency-domain raw fine frequencies, convert the fine frequencies to binned frequencies, select optimum binned frequencies, and convert the selected binned frequencies back into time-series signals fit for consumption by machine learning tools.

Advantageously, the systems and methods described herein for autonomous discrimination of operation vibration signals can be applied for any mechanical, electromechanical, or thermal-hydraulic flow system equipped with affixed accelerometers. Note that in thermal-hydraulic flow systems, the vibration need not be rotationally induced, it may instead be flow-induced vibration (FIV). Detection of anomalies in FIV is an outstanding way to discover problems with flow system components. Such flow system components vary widely, and include high-flow tube-and-shell heat exchangers and packed-column scrubbers found in the oil and gas industry. Anomalies in FIV can also signal the onset of departure-from-nucleate boiling (DNB), an engineering problem in thermal-hydraulic heat-transfer systems such as flow cooling systems for enterprise-level computer processors (where the thermal flux per square centimeter of the latest CPU chips can exceed the thermal flux per square centimeter of nuclear fuel elements).

—Example Environment—

Figure 2:
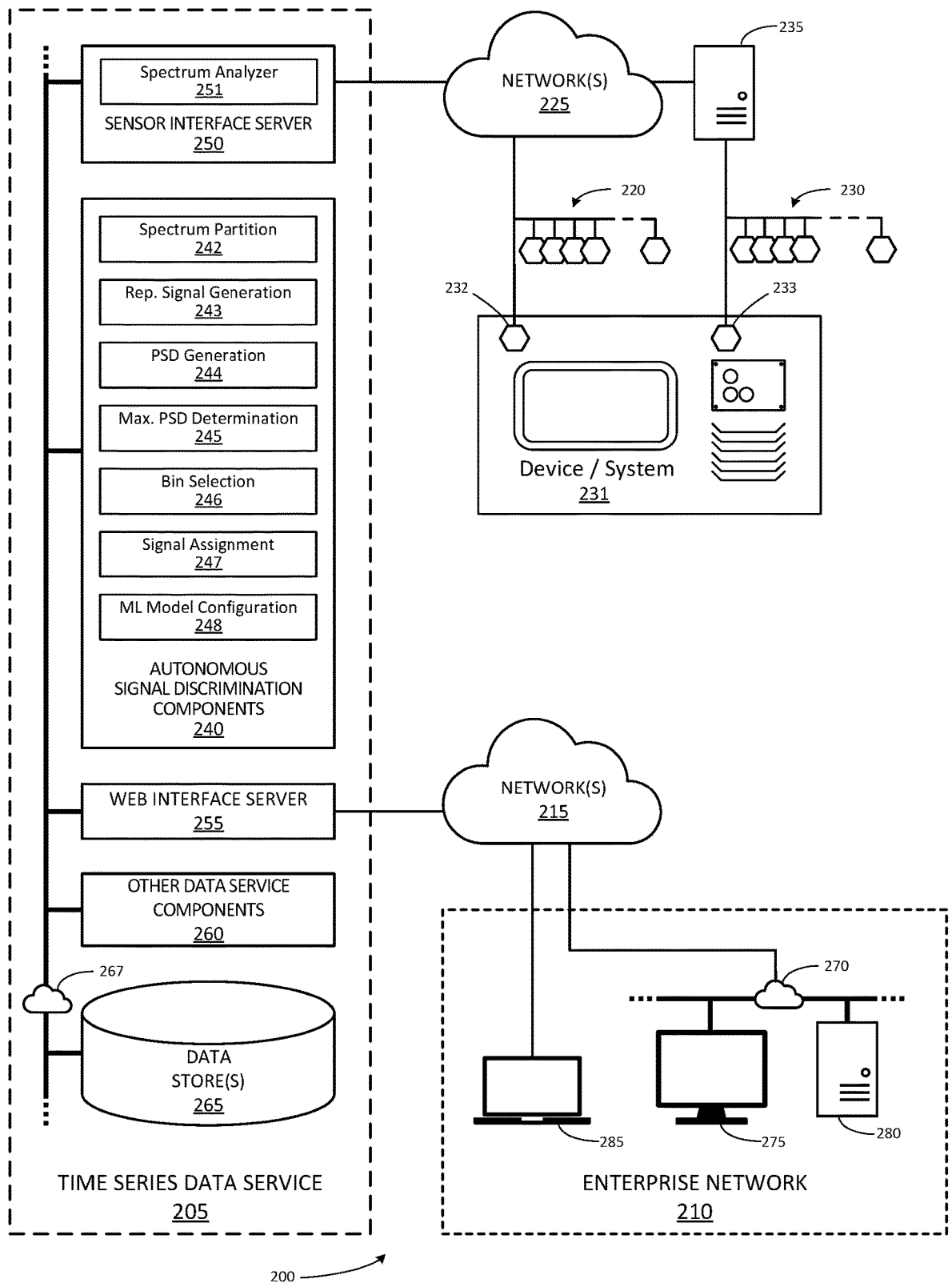
FIG. 2 illustrates one embodiment of a system associated with autonomous discrimination of operation vibration signals.

FIG. 2 illustrates one embodiment of a system 200 associated with autonomous discrimination of operation vibration signals. In one embodiment, the system 200 includes a time series data service 205 and an enterprise network 210 connected by a network 215 such as the Internet and/or private networks. In one embodiment, networks 215 and 225 are the same network, and in another embodiment, networks 215 and 225 are separate networks. The time series data service 205 is connected either directly to vibration sensors (such as vibration sensors 220) or data acquisition units (DAQs) such as remote terminal units (RTUs) through a network 225 or indirectly to vibration sensors (such as vibration sensors 230) or DAQs through one or one or more upstream devices 235.

In one embodiment, time series data service 205 includes various systems such as autonomous signal discrimination components 240, a sensor interface server 250, a web interface server 255, other data service components 260, and data store 265. Each of these systems 240, 250, 255, 260, 265 are configured with logic, for example by various software modules, for executing the functions they are described as performing. In one embodiment, the components of time series data service 205 are implemented on one or more hardware computing devices or hosts interconnected by a data network or cloud network (such as server-side network 267). For example, the components of time series data service 205 may be executed by network-connected computing devices of one or more compute hardware shapes, such as general purpose central processing unit (CPU) shapes, dense input/output (I/O) shapes, graphics processing unit (GPU) shapes, and HPC shapes. In one embodiment, the components of time series data service 205 are each implemented by dedicated computing devices. In one embodiment, several or all components of time series data service 205 are implemented by a common (or shared) computing device, even though represented as discrete units in FIG. 2. In one embodiment, components of time series data service 205 may be implemented across multiple computing devices.

In one embodiment, autonomous signal discrimination components 240 include a spectrum partition component 242, a representative signal generation component 243, a PSD generation component 244, a maximum PSD determination component 245, a bin selection component 246, a signal assignment component 247, and an ML model configuration component 248. In one embodiment, each of these components are implemented as a software module. In one embodiment, spectrum partition component 242 is configured to partition a frequency spectrum of output (collected from one or more vibration sensors monitoring a reference device) into a plurality of discrete bins, for example as described in further detail herein. In one embodiment, representative signal generation component 243 is configured to generate a representative time series signal for each bin while the reference device is operated in a deterministic stress load test pattern, for example as described in further detail herein. In one embodiment, PSD generation component 244 is configured to generate a power spectral density for each bin by converting each time series signal from the time domain to the frequency domain, for example as described in further detail herein. In one embodiment, maximum PSD determination component 245 is configured to determine a maximum power spectral density value for each bin, for example as described in further detail herein. In one embodiment, bin selection component 246 is configured to select a subset of the bins having the maximum power spectral density values exceeding a first threshold, for example as described in further detail herein. In one embodiment, signal assignment component 247 is configured to assign the representative time series signals from the selected subset of bins as operation vibration signals indicative of operational load on the reference device, for example as described in further detail herein. In one embodiment, ML model configuration component 248 is configured configure a machine learning model based on operation vibration signals from training data to predict or estimate correct or expected values for operation vibration signals, for example as described in further detail herein. In one embodiment, components 242-248 are software modules that configure a computing device to execute the functions described herein for these components.

In one embodiment, the components of time series data service 205 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. Each component of time series data service 205 may (i) generate or compose an electronic message or signal to issue a command or request to another component, (ii) transmit the message or signal to other components using the infrastructure of scheduling, dispatch, and routing system 205 and (iii) parse the content of an electronic message or signal received to identify commands or requests that the component can perform, and in response to identifying the command, the component will automatically perform the command or request.

In one embodiment, time series data service 205 may be implemented as a service on cloud infrastructure. In one embodiment, time series data service 205 may be hosted by a dedicated third party, for example in an infrastructure-as-a-service (IAAS), platform-as-a-service (PAAS), or software-as-a-service (SAAS) architecture. In one embodiment, time series data service 205 may be implemented on on-premises infrastructure, such as a set of one or more dedicated servers.

In one embodiment, time series data service 205 may be hosted by a third party, and/or operated by a third party for the benefit of multiple account owners/tenants, each of whom is operating a business, and each of whom has an associated enterprise network 210. In one embodiment, either of time-series service 205 and enterprise network 210 may be associated with business entities operating in any of a variety of industries (such as Oil & Gas production, Utilities, Aviation, and data center IT) which use vibration sensors to monitor the operational health of systems and devices. In one embodiment, time series data service 205 is configured with logic, such as software modules, to operate the time series data service 205 to autonomously discriminate operation vibration signals from ambient vibration and random noise, and to prognostically detect or discover anomalous operation vibration signals, in accordance with the systems and methods described herein.

In one embodiment, vibration sensors 220 and 230 may be any type of electrical, mechanical (including piezo-based), or optical vibration sensors. In one embodiment, vibration sensors 220 and 230 may be affixed to a mechanical device or system 231, for example as shown by sensors 232, 233, to monitor vibration of device or system 231. The vibration detected in device or system 231 can include vibration produced by the operation of device or system 231 and ambient vibration from outside device or system 231 (for example, caused by operation of nearby devices or devices coupled to device or system 231). The device or system 231 generally include any type of machinery or facility with components that perform measurable activities. Device or system 231 may be stationary (such as an oil or gas pump) or mobile (such as an automobile, aircraft, or other vehicle). Vibration sensors 220, 230, 232, 233 may be network-connected sensors for monitoring any type of physical phenomena. The network connection of vibration sensors 220, 230, 232, 233 may be wired or wireless. In one embodiment, upstream device 235 may be a gateway device configured to enable vibration sensors 230, 233 to communicate with sensor interface server 250.

In one embodiment, the vibration sensors 220, 230, 232, 233 are connected through network 225 to sensor interface server 250. In one embodiment, sensor interface server 250 is configured with logic, such as software modules, to collect readings from vibration sensors 220, 230, 232, 233 and store them as observations in a time series data structure, for example in data store 260. The sensor interface server 250 is configured to interact with the sensors, for example by exposing one or more application programming interfaces (APIs) configured to accept readings from vibration sensors 220, 230, 232, 233 using sensor data formats and communication protocols applicable to the vibration sensors 220, 230, 232, 233. In one embodiment, sensor interface server 250 passively receives sensor readings actively transmitted by vibration sensors 220, 230, 232, 233. In one embodiment, sensor interface server 250 includes a spectrum analyzer 251 configured to measure the magnitude at frequency of input signals from vibration sensors 220, 230, and output a time series of magnitudes of inputs across a full frequency range sensed by vibration sensors 230.

For simplicity and clarity of explanation, the enterprise network 210 is represented by an on-site local area network 270 to which one or more personal computers 275, or servers 280 are operably connected, along with one or more remote user computers 285 that are connected to the enterprise network 210 through the network 215 or other suitable communications network or combination of networks. The personal computers 275 and remote user computers 285 can be, for example, a desktop computer, laptop computer, tablet computer, smartphone, or other device having the ability to connect to local area network 270 or network 215 or having other synchronization capabilities. The computers of the enterprise network 210 interface with time series data service 205 across the network 215 or another suitable communications network or combination of networks.

In one embodiment, remote computing systems (such as those of enterprise network 210) may access information or applications provided by the time series data service 205 through web interface server 255. For example, computers 275, 280, 285 of the enterprise network 210 may access autonomous signal discrimination components 240 from time series data service 205. In one embodiment, the remote computing system may send requests to and receive responses from web interface server 255. In one example, access to the information or applications may be effected through use of a web browser on a personal computer 275 or remote user computers 285. For example, these computing devices 275, 280, 285 of the enterprise network 210 may request and receive a web-page-based graphical user interface (GUI) for accessing information provided by autonomous signal discrimination components 240. In one example, these communications may be exchanged between web interface server 255 and server 280, and may take the form of remote representational state transfer (REST) requests using JavaScript object notation (JSON) as the data interchange format for example, or simple object access protocol (SOAP) requests to and from XML servers.

In one embodiment, data store(s) 265 includes one or more databases (such as data historian archives, time-series databases, or signal databases) or other data structures configured to store and serve time series data received by sensor interface server 265 from vibration sensors 220, 230, 232, 233. The time series data may consist of values sensed by one or more sensors at regular or irregular intervals and stored in association with both the sensor and the time the value was sensed. In one embodiment, the time series database is an Oracle® NoSQL database for time series data. In some example configurations, data store(s) 265 may be implemented using one or more Oracle® Exadata compute shapes, network-attached storage (NAS) devices and/or other dedicated server device. API calls may include queries against databases. The queries may be composed in SQL and executed in a SQL runtime, or use other appropriate query languages and environments. For example, where the database is configured to store and serve time series data, the queries may be composed in a NoSQL language with time series specific commands, and executed in a NoSQL runtime.

—Example Method—

In one embodiment, each step of computer-implemented methods described herein may be performed by a processor (such as processor 1310 as shown and described with reference to FIG. 13) of one or more computing devices (i) accessing memory (such as memory 1315 and/or other computing device components shown and described with reference to FIG. 13) and (ii) configured with logic to cause the system to execute the step of the method (such as autonomous vibration signal discrimination logic 1330 shown and described with reference to FIG. 13). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 1315, or storage/disks 1335 of computing device 1305 or remote computers 1365 shown and described with reference to FIG. 13, or in data stores 265 shown and described with reference to FIG. 2).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 3:
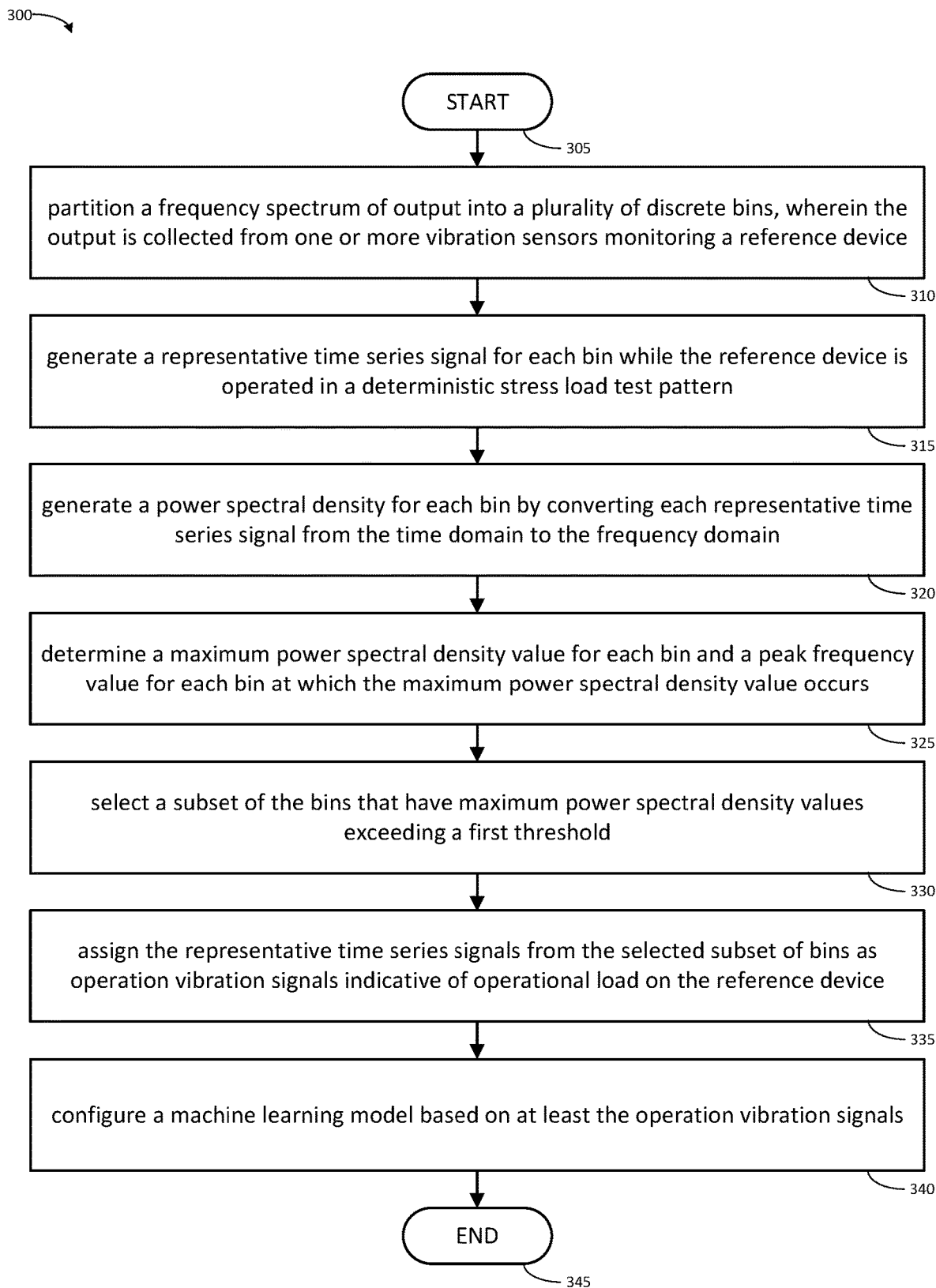
FIG. 3 illustrates one embodiment of a method associated with autonomous discrimination of operation vibration signals.

FIG. 3 illustrates one embodiment of a method 300 associated with autonomous discrimination of operation vibration signals. In one embodiment, the steps of method 300 are performed by autonomous signal discrimination components 240 (as shown and described with reference to FIG. 2). In one embodiment, autonomous signal discrimination components 240 is a special purpose computing device (such as computing device 1305) configured with autonomous vibration signal discrimination logic 1330. In one embodiment, autonomous signal discrimination components 240 is a module of a special purpose computing device configured with logic 1330. In one embodiment, ML prognostic monitoring of vibration signals is enabled by the steps of method 300, which automatically identifies the frequency representatives to provide to a prognostic ML model that best characterize the operation signatures of a device for condition-based health monitoring. In one embodiment, real-time prognostic early identification of vibration anomalies is enabled by the steps of method 300, where such real-time identification was not previously possible due to the inability to autonomously discriminate vibration signal components associated with changes in operational load on a device.

The method 300 may be initiated automatically based on various triggers, such as in response to receiving a signal over a network or parsing stored data indicating that (i) a user (or administrator) of time series data service 205 has initiated method 300, (ii) that method 300 is scheduled to be initiated at defined times or time intervals, (iii) a user (or administrator) has begun a scan of a device to automatically discriminate vibration frequencies that correspond to variations in load on the device, (iv) in response to the completion of a scan of vibrations of a device operated in a test pattern of varying load; or (v) in response to the presentation of a time series database of vibrations recorded from a device operated in a test pattern of varying load. The method 300 initiates at START block 305 in response to parsing a signal received or stored data retrieved and determining that the signal or stored data indicates that the method 300 should begin. Processing continues to process block 310.

At process block 310, the processor partitions a frequency spectrum of output into a plurality of discrete bins, wherein the output is collected from one or more vibration sensors monitoring a reference device. In one embodiment, one or more accelerometers affixed to a device generate continuous frequency spectrum output of the vibration of the device. The processor accepts the continuous frequency spectrum output from the accelerometer. The processor executes a frequency analyzer to sweep the continuous frequency spectrum output. The processor subdivides or partitions of the swept spectrum into a plurality of bins, or groups of contiguous raw frequencies. The raw frequencies trace out time series signals correlated with the activity of the device or system being measured. Not every frequency will contain the analyzable physical content associated with the device activities. Some frequencies exhibit dynamic (changing in amplitude) responses correlated with device workload, while random noise is in the other frequencies. Generally, the bins are discrete, that is, the groups of raw frequencies included in a bin does not overlap with groups of raw frequencies in another bin. In one example, the bins are of equal size, each having the same number of raw frequencies. In one embodiment, the vibration frequency spectrum is divided into 100 bins. This number of may be adjusted depending the frequency range supported by the analyzer. In practice, 100 bins has yielded satisfactory results. The device is a reference device in that it is a device of known performance and/or degradation state. Vibration frequencies (selected by method 300) of the reference device is used as a basis or standard for evaluation of the performance of other devices of the same (or similar) type. In one embodiment, the reference device is a "golden system," or device certified to operate within correct parameters and/or to be free of degraded components. In one embodiment, the steps of process block 310 are implemented by spectrum partition components 242 of autonomous signal discrimination components 240. Once the processor has thus completed partitioning a frequency spectrum of output into a plurality of discrete bins, wherein the output is collected from one or more vibration sensors monitoring a reference device, processing at process block 310 completes, and processing continues to process block 315.

At process block 315, the processor generates a representative time series signal for each bin while the reference device is operated in a deterministic stress load test pattern.

In one embodiment, the reference device is operated in a test pattern that places a deterministic stress load on the device. The deterministic stress load is a load that varies in a pre-planned (deterministic) manner so that the patterns of operation of the device are known beforehand. Frequencies that are indicative of the load on a device will exhibit a pattern similar to the deterministic stress load. This deterministic stress load can be referred to informally as a "wiggle" in the workload of the device. In one example, the deterministic stress load or wiggle may have a regular period (that is, it may repeat at the same interval of time). In one embodiment, the deterministic stress load is sinusoidal, progressing smoothly through load minima and load maxima. In one embodiment, the deterministic stress load has a square wave pattern, transitioning immediately (or at least rapidly) to and from load minima and load maxima. In one embodiment, the processor controls the operation of the reference device in the deterministic stress load, for example by directly operating variable speed controls of the reference device in accordance with the test pattern, or by transmitting an instruction to execute the test pattern to a controller of the device.

For systems with variable speed controllers (including rotating machinery such as centrifugal fluid pumps, generators, motors, motor-generator sets, variable-speed fans, blowers, compressors, turbines, gear boxes, spindle motors, etc.), where the controller for the device is programmable, then an ideal multi-frequency calibration exercise (test pattern) is to introduce a programmed sinusoidal variation in device operation load. Devices and systems that are controlled through an electronic interface, through a programmable logic controller (PLC), or through a firmware-controlled API generally have continuously variable load control. The processor may then operate the continuously variable load control of the device or system and generate a sinusoidal load profile for a brief training/test period. Where sinusoidal control of the device is unavailable, the systems and methods herein also work well for the use cases wherein the device has two performance levels (for example, on/off, High/Low, Idle/High, etc.), or a small finite number of settings (for example, 3 speed settings, or a finite number of discrete settings). Even where the device has in the worst case of having two performance settings (for example, Idle/High), the systems and methods described herein works well with the simple square-wave high/low profile produced. A succession of at least five equally spaced high/low square waves is recommended.

A sinusoidal variation in workload over a five minute training/test period may also be introduced in computing devices with programmable workloads (such as in enterprise-level server computers) by execution of a workload script that interrupts the workload and later resumes the workload with no loss in state for any computations. During the training/test period, the workload script generates a sinusoidal variation in workload that takes the computing device from idle to max (max CPU, memory, and I/O) in several cycles over a five minute training/test period. For computing devices that do not have programmable workload capability, the machine may be simply toggled from idle to max (for example, in 30 second intervals) creating a square wave workload profile.

In one embodiment, the execution of the deterministic stress load by the monitored device produces a periodic variation in demand for the mechanical, electromechanical, or thermal-hydraulic reference device being monitored. In one embodiment, the period of the periodic variation is short, repeating multiple times within minutes. In one embodiment, the test pattern repeats multiple cycles during a training window period of time. In practice, a training/test window of five minutes including five cycles through load minimum and maximum has yielded satisfactory results. Thus, in one embodiment, the deterministic stress load test pattern is one of a sinusoidal stress load, a stress load regularly cycling between on and off states, a stress load regularly cycling between high and low states, and a stress load regularly cycling between high and idle states.

In one embodiment, the processor monitors the frequencies detected by the vibration sensors affixed to the device while the device is operating according to the test pattern that places the deterministic stress load on the device. For each bin in the frequency spectrum, the processor generates a representative time series signal that characterizes the response of raw frequencies in the bin to the changes in load caused by the test pattern. In one embodiment, the bins are sampled at the fastest sampling rate for other telemetry metrics (such as temperatures, voltages, currents, RPMs, etc.). In one embodiment, the representative signal for a bin is the average (mean) of the time signals for each raw frequency of the bin (where the frequency amplitude value at each observation of the representative signal is the mean of the frequency amplitude values for all the raw frequency time signals in the bin at corresponding observations). In one embodiment, the representative signal for a bin is the average (mean) of a set of most intercorrelated raw frequency time signals in the bin (where the frequency amplitude value at each observation of the representative signal is the mean of the frequency amplitude values for the subset of most highly intercorrelated raw frequency time signals in the bin at corresponding observations). For example, the set of most intercorrelated raw frequency time signals may be those raw frequency signals in the $90^{th}$ percentile of intercorrelation. Selecting signals for intercorrelation reduces the importance of raw frequencies with highly stochastic or noisy content, and increases the importance of frequencies which behave congruently with the operation of the test pattern. In either case (whether using the set of all raw frequencies in the bin, or using these of most intercorrelated frequencies in the bin) the processor calculates the average across the set at each observation to generate the representative signal for the bin. The processor then stores the representative signal for the bin, for example in a data structure associated with the bin.

In one embodiment, the steps of process block 315 are implemented by representative signal generation components 243 of autonomous signal discrimination components 240. Once the processor has thus completed generating a representative time series signal for each bin while the reference device is operated in a deterministic stress load test pattern, processing at process block 315 completes, and processing continues to process block 320. In one embodiment, process blocks 310-315 of method 300 represent a frequency-domain to time-domain transformation in the frequency-domain to time-domain to frequency-domain double transformation described herein.

At process block 320, the processor generates a power spectral density for each bin by converting each representative time series signal from the time domain to the frequency domain. In one embodiment, the processor executes a Fourier transform, such as a fast Fourier transform (FFT) or discrete Fourier transform (DFT), on the values of each representative time series signal. The resulting curve is a power spectral density (PSD) for the bin. The processor stores the PSD for each bin, for example in a data structure associated with the bin. From the power spectral density for a bin, the processor may identify the frequency components of the representative time signal for the bin. The peaks of the PSD curve indicate the frequencies of components of the representative time signal. In one embodiment, the steps of process block 320 are implemented by power spectral density generation components 244 of autonomous signal discrimination components 240. Once the processor has thus completed generating a power spectral density for each bin by converting each representative time series signal from the time domain to the frequency domain, processing at process block 320 completes, and processing continues to process block 325.

At process block 325, the processor determines a maximum power spectral density value for each bin and a peak frequency value for each bin at which the maximum power spectral density value occurs. In one embodiment, for each bin, the processor steps through the frequency values along the PSD curve for the bin, and examines amplitude value at each frequency value. The processor examines the amplitude value by comparing the amplitude value to a "current maximum amplitude" value. The current maximum amplitude value is initialized at 0. A "current peak frequency" value that indicates the frequency at which the current maximum amplitude value occurs is also initialized, for example to 0. When the amplitude value at a frequency along the PSD curve exceeds the current maximum, the current maximum amplitude is replaced with the amplitude value currently under examination, and the current peak frequency value is replaced with the frequency value at which the current maximum amplitude occurs. Once the amplitudes at each frequency of the PSD curve have been examined, the current maximum amplitude value is the maximum amplitude value for the PSD curve, and the current peak frequency value is the frequency at which the maximum amplitude for the PSD curve occurs. The processor stores the current maximum amplitude as maximum PSD value of the bin and stores the current peak frequency value as the peak frequency value of the bin, for example in data structures associated with the bin. The processor then proceeds to repeat the process of determining the maximum PSD value (and associated peak frequency value) for each bin in turn, until no bins remain. In one embodiment, the steps of process block 325 are implemented by maximum power spectral density determination components 245 of autonomous signal discrimination components 240. Once the processor has thus completed determining a maximum power spectral density value for each bin and a peak frequency value for each bin at which the maximum power spectral density value occurs, processing at process block 325 completes, and processing continues to process block 330.

At process block 330, the processor selects a subset of the bins that have maximum power spectral density values exceeding a threshold. In one embodiment, the processor ranks the bins by maximum power spectral density value, for example by sorting the bins in descending order by their respective maximum PSD. In one embodiment, the processor retrieves the threshold from memory or storage. In one embodiment, the threshold is pre-configured by users or administrators of the system executing method 300. In one embodiment, threshold is a percentile, the processor selects those bins in a topmost percentile in terms of maximum PSD to belong to the subset, for example the top 20 percent. Thus, in one embodiment, the threshold is having a maximum power spectral density value in at least an $80^{th}$ percentile of the maximum power spectral density values of all bins. In one embodiment, the threshold is a given number, and the processor selects the given number of bins topmost in terms of maximum PSD to belong to the subset, for example, the top 20 bins. In practice, a threshold of selecting the top 20 bins has yielded satisfactory results, delivering outstanding prognostic monitoring by a ML model trained on the representative time series signals for the top 20 bins at a very reasonable compute cost. The processor then stores the subset of bins for subsequent processing, for example in a data structure associated with the device or the spectrum. Note, time series signals with the highest PSD peaks most closely couple device operation vibrational measurements, and are therefore the most informative narrow-band signals to include in time-series machine learning analysis of device vibration. In one embodiment, the steps of process block 330 are implemented by bin selection components 246 of autonomous signal discrimination components 240. Once the processor has thus completed selecting a subset of the bins that have maximum power spectral density values exceeding a first threshold, processing at process block 330 completes, and processing continues to process block 335.

At process block 335, the processor assigns the representative time series signals from the selected subset of bins as operation vibration signals indicative of operational load on the reference device. In one embodiment, the processor describes the component time series signals that make up the representative time series signal for each bin in the subset of bins, and records the description in a data structure describing a set of operation vibration signals. The processor then stores the data structure for subsequent processing. In one embodiment, the description of the component time series signals includes a listing of the frequency slices within the bins which are combined (for example, by finding an average—mean or median—at each observation) to make up the representative time series signal. In one embodiment, the processor retrieves the representative time series signals for each bin in the subset of bins, and stores them for future processing as a training time series database of operation vibration signals. In one embodiment, the representative time series signals for the subset of bins are retrieved by sampling the bins. In one embodiment, the bins in the subset are sampled with a sampling rate that matches other sensor telemetry for the reference device, for example, once every 2 seconds or once every 5 seconds. Selection of one operation vibration signal from each of the topmost bins ensures broad coverage of the frequency spectrum by the operation vibration signals. In one embodiment, the steps of process block 335 are implemented by signal assignment components 247 of autonomous signal discrimination components 240. Once the processor has thus completed assigning the representative time series signals from the selected subset of bins as operation vibration signals indicative of operational load on the reference device, processing at process block 335 completes, and processing continues to process block 340.

At process block 340, the processor configures a machine learning model based on at least the operation vibration signals. In one embodiment, the processor provides operation vibration signals—time series signals from the reference device for the peak frequencies of the selected subset of bins—as the training signals for a prognostic machine learning (ML) model. In one embodiment, the prognostic ML model is implemented as a one or more non-linear non-parametric (NLNP) regression algorithms used for multivariate anomaly detection, including neural networks (NNs), Support Vector Machines (SVMs), autoassociative kernel regression (AAKR), and similarity-based modeling (SBM) such as the multivariate state estimation technique (MSET) (including Oracle's proprietary Multivariate State Estimation Technique (MSET2)). Thus, in one embodiment, the ML model is a NLNP model or an MSET model. The processor executes a supervised learning process on a range of observations of the operation vibration signals designated as a training set. The designation of the range of observations as a training set indicates that signal values at each observation are appropriate or expected given the other signal values at the observation. The operation vibration signals designated as a training set may be collected during a period of normal operation of the reference device, wherein normal operation indicates that the reference device is functioning within appropriate or expected vibration levels. Accordingly, in one embodiment, configuring the machine learning model includes training the machine learning model with the operation vibration signals collected during a training period of normal operation of the reference device. The ML model is configured to execute an objective function that outputs expected (or predicted) values of the input signals, given the actual (or observed) values of the input signals. The processor iteratively optimizes the objective function of the ML model to correctly determine values of operation vibration signals, given the training set of operation vibration signals. The trained ML model is then stored for subsequent use to monitor operation vibration signals of devices of the same (or similar) type as the reference device. In one embodiment, the steps of process block 340 are implemented by ML model configuration components 248 of autonomous signal discrimination components 240. Once the processor has thus completed configuring a machine learning model based on at least the operation vibration signals, processing at process block 340 completes, and processing continues to END block 345, where process 300 ends. Further details of the implementation of method 300 are shown and described elsewhere herein.

In one embodiment, the ML model trained with the operation vibration signals of a reference device is used to monitor operation vibration signals of a target device of the same (or similar) type as the reference device. In one embodiment, the reference device and the target device are the same device. In one embodiment, the reference device and the target device are different devices. In one embodiment, the processor further monitors operation vibration signals of a target device with the trained model during a surveillance period of operation to detect vibration anomalies. The processor executes the trained ML model to estimate values of the operation vibration signals. The processor calculates the residuals (the absolute value of the difference) between observed values for the operation vibration signals and model-estimated values for the operation vibration signals. The processor executes a fault detection model to detect anomalous behavior in the operation vibration signals. In one embodiment, the fault detection model uses the sequential probability ratio test (SPRT) to detect anomalous deviations from normal operation (or faults) by calculating a cumulative sum of the log-likelihood ratio for each successive residual between the measured signals and estimated values, and comparing the cumulative sum against a threshold at which to determine that a fault is detected. Where the threshold is crossed, a vibration anomaly is detected in one or more of the operation vibration signals of the target device. In one embodiment, the processor further transmits a predictive maintenance alert in response to detection of a vibration anomaly in one or more of the operation vibration signals of the target device. In one embodiment, the processor composes the predictive maintenance alert before transmitting it, for example by retrieving a stored template for the predictive maintenance alert and populating it with information describing the vibration anomaly as the basis for the alert. In one embodiment, the predictive maintenance alert is an electronic message, such as an email to the account of an individual responsible for maintaining the target device, or an API request to control system that operates the target device. In one embodiment, the predictive maintenance alert states that a vibration anomaly has been detected, and suggests maintenance of one or more components of the target device.

—Example Implementation: Compute Hardware—

As discussed above, the continuous frequency spectrum output by vibration sensors (such as accelerometers) is swept and divided by the processor into a number of discrete and wide frequency bins, and each bin consists of a number of raw frequencies, which trace out timeseries signals that are correlated with the activity of the system being measured. But, not every frequency will contain the analyzable physical content associated with the activities of the device or system. It is often the case that some specific frequencies exhibit dynamics (changes in amplitude) related to device workload, while the other frequencies exhibit random noise. Thus, each frequency bin could contain both noise and signals with meaningful physical content. A challenge resolved by the systems and methods disclosed herein is to extract those signals with meaningful contents from all discrete frequency bins, intensify their Signal-to-Noise Ratio (SNR), and finally select the top signals that best characterize and reveal the dynamics of the system.

The novel approach shown and described herein for autonomous discrimination of operation vibration signals is applied to with an example real-world use case: autonomous discrimination of operation vibration signals that reflect the operational load of an enterprise server device. (The features of this approach for autonomous discrimination of operation vibration signals may be applied generally to use cases of other physical devices.) Accelerometer-detected vibrations generated by an operating server are measured with a spectrum analyzer and an accelerometer, and the frequency responses are output for frequency binning and characterization. The server runs a test program that causes a deterministic stress load on the server device so that the pattern of load on the server are known beforehand and may compared with vibration signals of the server. Vibration signals of the server that are signatures of operational loading on the server exhibit a similar pattern to the deterministic stress load on the server.

Figure 4:
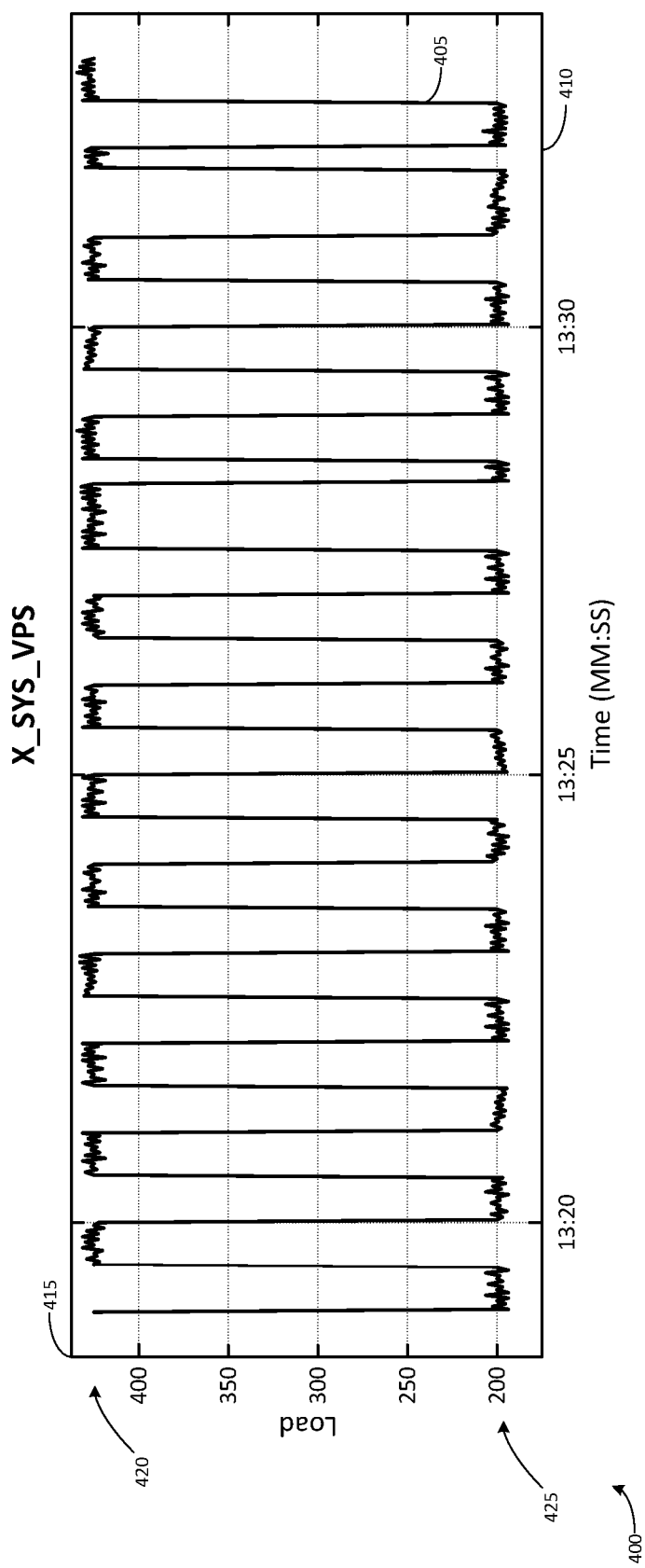
FIG. 4 illustrates a plot of an example deterministic stress load test pattern executed by the server.

FIG. 4 illustrates a plot 400 of an example deterministic stress load 405 test pattern executed by the server. The operation of deterministic stress load 405 is plotted against time axis 410 (with units given in minutes and seconds) and a load axis 415. The deterministic stress load 405 on the server includes an "on" or "active" state represented by a load of approximately 475 420 and an "off" or idle state represented by a load of approximately 200. Deterministic stress load 405 cycles through the off and on states once per second.

An accelerometer (for example one of vibration sensors 220, 230) senses vibrations of the server, and a spectrum analyzer (such as spectrum analyzer 251) measures the sensed vibrations of the server and outputs the frequency responses across the sensed spectrum of vibrations. The sensed spectrum of vibrations is divided into discrete bins. In this example case study, 100 bins are used. The number of bins may be adjusted depending the frequency range supported by the spectrum analyzer.

Figure 5:
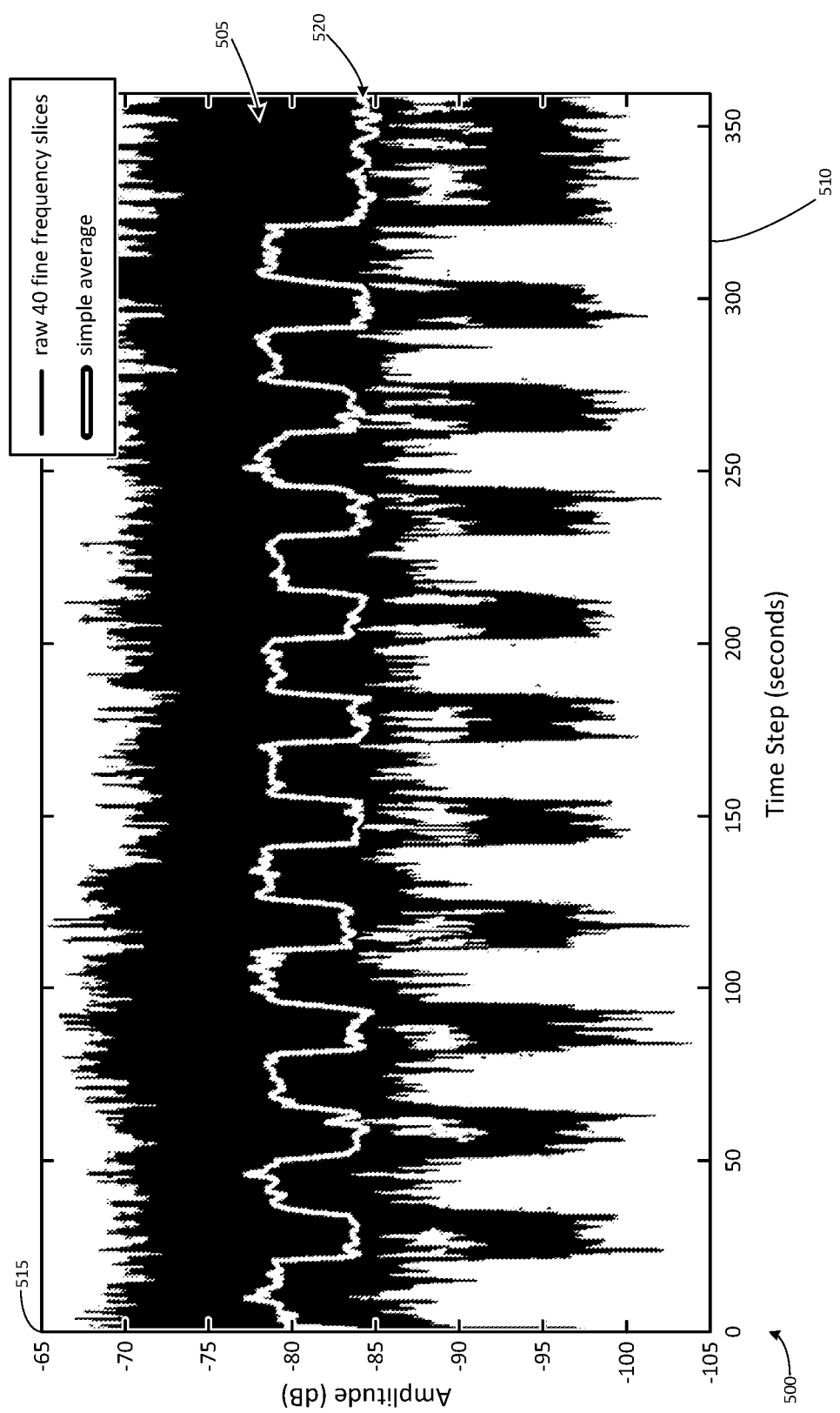
FIG. 5 illustrates a plot of the frequencies in one example bin of a vibration spectrum.

FIG. 5 illustrates a plot 500 of the frequencies in one example bin of a vibration spectrum. The bin includes 40 raw frequencies, represented by 40 time series signals 505. (Note that the considerable overlap of the plots of the time series signals 505 in the bin renders them visually indistinguishable in plot 500.) The time series signals 505 are plotted against time step axis 510 (with units given in seconds) and amplitude axis 515 (with units given in decibels). The raw frequencies are slices of the spectrum at equal spacing, for example, in a spectrum of 0 to 4000 Hz, with 100 bins, the raw frequencies are each spaced 1 Hz apart. As previously mentioned, many of the raw frequencies carry little more than random noise while the others exhibit the pattern of the stress load to some extent.

A simple average 520 over the 40 time series signals in the example bin is also shown plotted against time step axis 510 and amplitude axis 515 in plot 500. Generally, a simple average (such as simple average 520) over the time series signals in a bin serves to filter out some of the random noise and yields a signal with greater SNR because the random noises cancel out each other. But, this average often exhibits a lower range of change in amplitude due to variation in device workload (also referred to herein as "dynamic range") than the individual signals, because the average is diluted by the noisy measurements that do not correspond to load activity in the device. In this example case, even though the shape of the load is preserved and variability is mitigated, the dynamic range of the average is reduced so is suboptimal for modeling the operation signature of the system. Thus, the simple average 520 in the example bin yields a degraded frequency response because noise dominates the frequency responses.

To improve the frequency response for the bin, the top few signals in the frequency bin in terms of intercorrelation with other signals in the bin are identified and retrieved, and the SNR is intensified (that is, improved) by averaging the highly intercorrelated signals. Specifically, all signals in the bin go through a correlation matrix assessment, and the correlation coefficients are summed over the signals and sorted from lowest to highest. Then the signals corresponding to the top 10 percentile are selected and averaged, yielding a single timeseries signal for that frequency bin. Percentile is used instead of correlation coefficient as the threshold so this approach is adaptive and can be applied to the frequency bin in any SNR.

Figure 6:
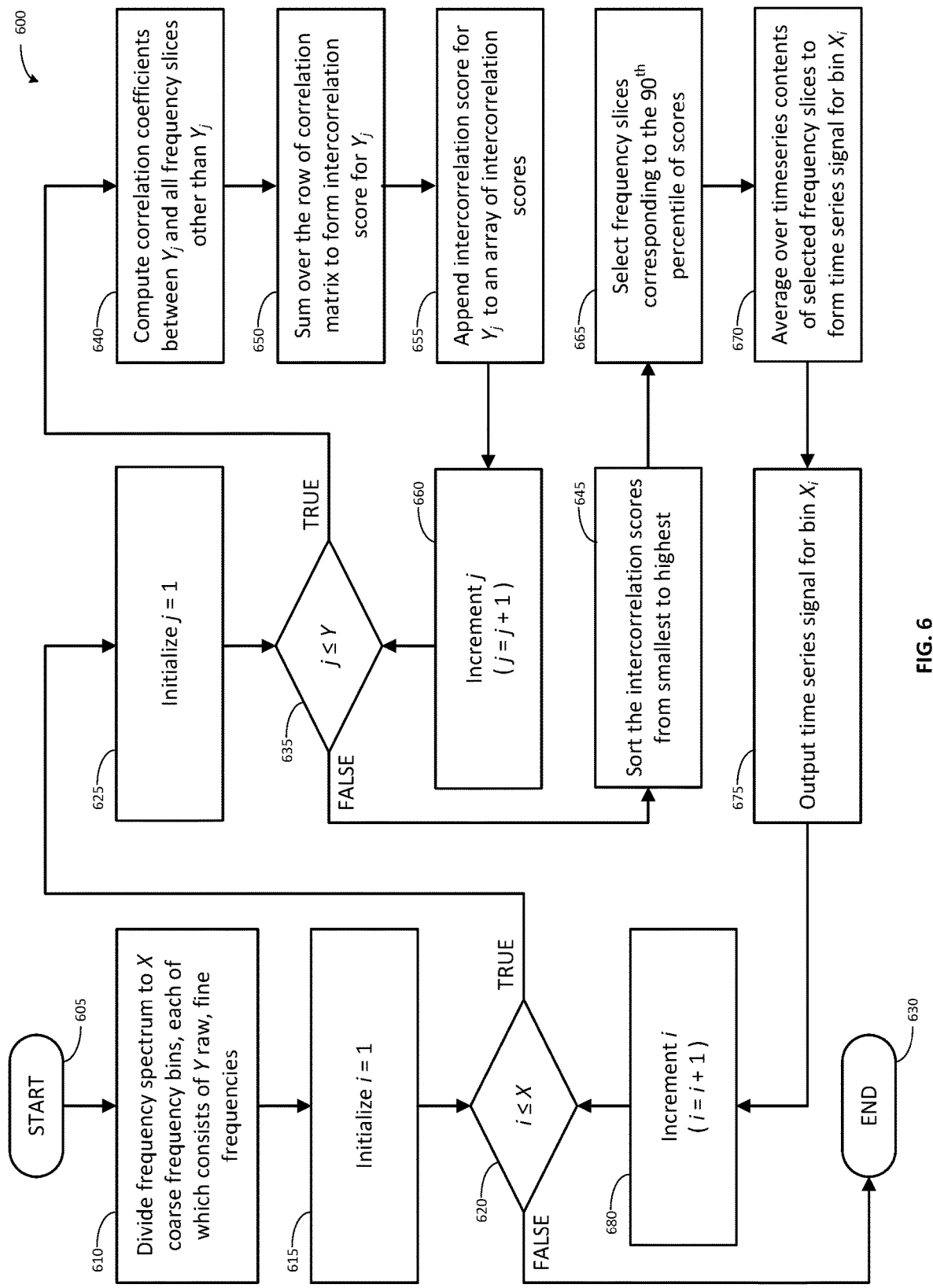
FIG. 6 illustrates one embodiment of a method for frequency binning characterization associated with autonomous discrimination of operation vibration signals.

FIG. 6 illustrates one embodiment of a method 600 for frequency binning characterization associated with autonomous discrimination of operation vibration signals. In one embodiment, the steps of method 600 are performed by spectrum partition components 242 and representative signal generation components 243 of autonomous signal discrimination components 240 (as shown and described with reference to FIG. 2). The method 600 may be initiated automatically based on various triggers, such as in response to receiving a signal over a network or parsing stored data indicating that (i) a user (or administrator) of time series data service 205 has initiated method 600, (ii) that method 600 is scheduled to be initiated at defined times or time intervals, (iii) a user (or administrator) has begun a scan of a device to automatically discriminate vibration frequencies that correspond to variations in load on the device, (iv) in response to the completion of a scan of vibrations of a device operated in a test pattern of varying load; or (v) in response to the presentation of a time series database of vibrations recorded from a device operated in a test pattern of varying load. The method 600 initiates at START block 605 in response to parsing a signal received or stored data retrieved and determining that the signal or stored data indicates that the method 600 should begin. Processing continues to process block 610.

At process block 610, the processor divides a frequency spectrum into a number X of coarse frequency bins, each of which consists of a number Y of raw, fine frequencies. In one embodiment, the division into coarse frequency bins is performed substantially as shown and described with reference to process block 310 of method 300. Processing at process block 610 completes, and processing continues to process block 615.

At process block 615, the processor initializes a bin counter i to a value of 1. The bin counter i is an index number that indicates which bin of the set of all bins that make up the vibration frequency spectrum (in a range from bin no. 1 to bin no. X) is current bin under consideration in an outer processing loop shown and described below. In one embodiment, the processor declares an integer variable i for the bin counter, and executes an assignment operation to give i the integer value of 1. Once the processor has completed initializing bin counter i to a value of 1, processing at process block 615 completes, and processing continues to decision block 620.

Decision block 620 heads an outer processing loop that repeats for each of the bins that make up the vibration frequency spectrum. At decision block 620, the processor determines whether bins remain for generation of a representative time series signal (at block 645). In one embodiment, the processor makes this determination by evaluating whether the value of bin counter i is less than or equal to the total number of bins X across the vibration frequency spectrum. The processor retrieves the value of the number of bins X and the current value of bin counter i. The processor compares the values of X and i. Where the value of i is less than or equal to X, bins remain for generation of a representative time series signal. Where the value of i is not less than or equal to (that is, greater than) X, no bins remain for generation of a representative time series signal. Where the processor has determined that bins remain (i≤X: TRUE), processing at decision block 620 completes, and processing continues to process block 625. Where the processor has determined that no bins remain (i≤X: FALSE), processing at decision block 620 completes, the outer loop terminates, and processing continues to end block 630, where method 600 ends.

At process block 625, the processor initializes a frequency counter j to a value of 1. The frequency counter j is an index number that indicates which raw, fine frequency in a bin (in a range from frequency no. 1 to frequency no. Y) is current frequency under consideration in an inner processing loop shown and described below. In one embodiment, the processor declares an integer variable j for the bin counter, and executes an assignment operation to give j the integer value of 1. Once the processor has completed initializing bin counter j to a value of 1, processing at process block 625 completes, and processing continues to decision block 635.

Decision block 635 begins an inner processing loop that repeats for each fine frequency in a bin. At decision block 635, the processor determines whether frequencies remain for evaluation as to whether they are in a top percentile of intercorrelation (at block 660). In one embodiment, the processor makes this determination by evaluating whether the value of frequency counter j is less than or equal to the total number of fine frequencies Y across the bin. The processor retrieves the value of the number of fine frequencies Y the current value of frequency counter j. The processor compares the values of Y and j. Where the value of j is less than or equal to Y, frequencies remain for evaluation as to whether they are in a top percentile of intercorrelation among the fine frequencies of the bin. Where the value of j is not less than or equal to (that is, greater than) Y, no frequencies remain for evaluation as to whether they are in a top percentile of intercorrelation. Where the processor has determined that fine frequencies remain (j≤X: TRUE), processing at decision block 635 completes, and processing continues to process block 640. Where the processor has determined that no fine frequencies remain (j≤X: FALSE), processing at decision block 635 completes, the inner loop terminates, and processing continues to process block 645.

At process block 640, the processor computes correlation coefficients between the current frequency slice $Y_j$ and all other frequency slices in the bin other than $Y_j$. In one embodiment, the processor calculates a Pearson product-moment correlation coefficient between the time series signal for slice $Y_j$ and each other frequency slice in the bin other than $Y_j$, and records the resulting series of coefficient values, for example as a row (for $Y_j$) of a correlation matrix data structure. Processing at process block 640 then completes and processing continues to process block 650.

At process block 650, the processor sums over the row of the correlation matrix, resulting in an intercorrelation score for $Y_j$. In one embodiment, the processor retrieves each correlation coefficient in the series of coefficient values for $Y_j$ and adds them together, forming an intercorrelation score for $Y_j$. Process block 650 completes and processing continues to process block 655.

At process block 655, the processor appends or inserts the intercorrelation score into an array of intercorrelation scores. In one embodiment, the processor appends the intercorrelation score to an array data structure that holds intercorrelation scores in association with the frequency slice ($Y_j$) that the score is for. Process block 655 completes and processing continues to process block 660.

At process block 660, the processor increments the value of the frequency counter j by one. In one embodiment, the value of j is retrieved, the sum of the value of j and one is found, and the value of that sum is stored as the new value of j. This advances the inner loop to the next frequency slice under consideration. Process block 660 completes and processing continues to decision block 635, from which the inner loop repeats until no fine frequencies remain in the bin. When no fine frequencies remain in the bin, processing in the outer loop advances to process block 645.

At process block 645, the processor sorts the intercorrelation scores from smallest to highest. In one embodiment, the processor executes any one of a number of sorting algorithms to reorder the array of intercorrelation scores and associated frequency slices by value of intercorrelation score. For example, the processor may implement a comparison sort such as quick sort, merge sort, heap sort, block sort, or bubble sort. Process block 645 completes and processing continues to process block 665.

At process block 665, the processor selects frequency slices corresponding to the $90^{th}$ percentile of scores. In one embodiment, the processor calculates the threshold of the $90^{th}$ percentile of intercorrelation scores in the sorted array of intercorrelation scores, and generates an array of frequency slices within the bin that have intercorrelation scores in the $90^{th}$ percentile. The $90^{th}$ percentile has been found to be satisfactory in practice (as discussed below), but in one embodiment percentiles other than the $90^{th}$ percentile may also be used. Process block 665 completes and processing continues to process block 670.

At process block 670, the processor averages over the timeseries contents of the selected frequency slices to form a time series signal for bin $X_i$. In one embodiment, the processor generates a new representative time series signal for bin $X_i$ by computing the average (mean) value of the time series signals at each observation for the selected $90^{th}$ percentile frequencies, and setting the value for the observation in the new representative time series signal to be the computed average value. Process block 670 complete and processing continues to process block 675.

At process block 675, the processor outputs the time series signal for bin $X_i$. In one embodiment, the processor stores the generated new representative time series signal for subsequent processing, for example as a time series signal data structure associated with bin $X_i$. Process block 675 complete and processing continues to process block 680.

At process block 680, the processor increments the value of the bin counter i by one in a manner similar to that shown and described above for frequency counter j with reference to process block 660. This advances the outer loop to the next bin under consideration. Processing at process block 680 completes, and processing returns to decision block 620, from which the outer loop repeats until no bins remain unprocessed. When no bins remain, processing in the outer loop advances to end block 630, where method 600 ends. The inner and outer processing loops are shown and described with reference to FIG. 6 as a while loop, with a prior conditions expressed at decision blocks 620 and 635. Alternatively, the processing loops might also be implemented as a do-while loops with post conditions expressed following the loops.

At the completion of method 600, the processor has generated a representative signal for each bin that is the average signal value of those fine frequency signals in the bin that are within a threshold top percentile (in this example, the $90^{th}$ percentile) for intercorrelation. In one embodiment, the processor thus: computes correlation coefficients between each frequency in a bin and each other frequency in the bin, for example as shown and described with reference to process block 640, computes an intercorrelation score for each frequency in the bin from the correlation coefficients for the frequency, for example as shown and described with reference to process blocks 650-655; identifies a set of highly-intercorrelated frequencies in the bin, wherein the highly-intercorrelated frequencies have intercorrelation scores exceeding a threshold, for example as shown and described with reference to process blocks 645 and 665; and generates the representative time series signal for the bin from an average of time series values for each of the set of highly-intercorrelated frequencies, for example as shown and described with reference to process blocks 670-675. In one embodiment, the threshold for inclusion as a highly-intercorrelated frequency is having an intercorrelation score in at least a $90^{th}$ percentile of the intercorrelation scores for the bin.

Figure 7:
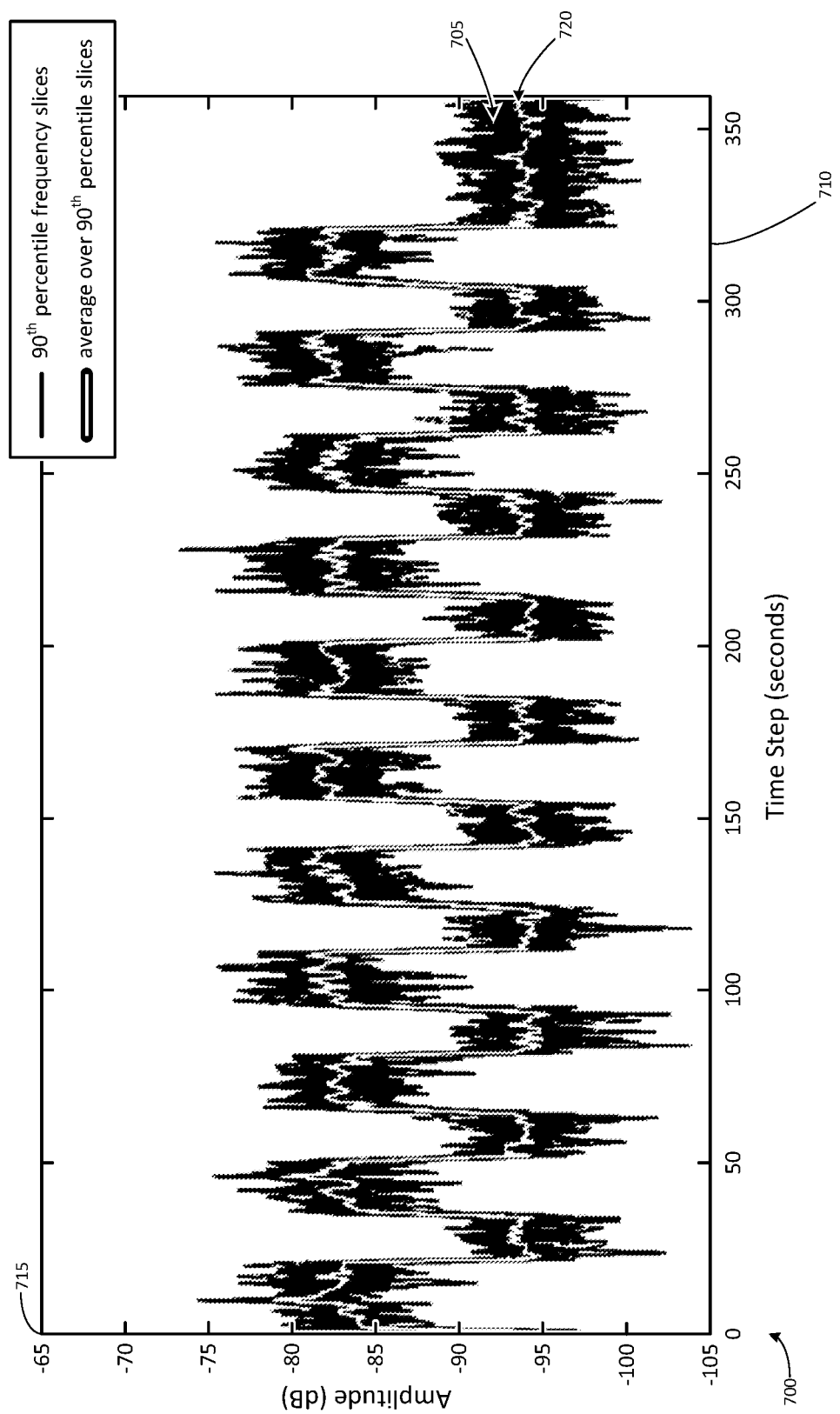
FIG. 7 illustrates a plot of $90^{th}$ percentile of frequencies in terms of intercorrelation in the example bin of the vibration spectrum.

The advantages of using the top few correlated signals in a bin (rather than the signals of all raw frequencies in a bin) becomes apparent when method 600 is applied to the example frequency bin shown and described above with reference to FIG. 5, the results of which are shown in FIG. 7. FIG. 7 illustrates a plot 700 of the $90^{th}$ percentile of frequencies in terms of intercorrelation in the example bin of the vibration spectrum. The $90^{th}$ percentile frequencies are represented by four time series signals 705. The four time series signals 705 are plotted against time step axis 710 (with units given in seconds) and amplitude axis 715 (with units given in decibels). A simple average 720 over the four, $90^{th}$ percentile time signals is also shown plotted against time step axis 710 and amplitude axis 715 in plot 700. Comparing plot 700 with plot 500 shows the clear improvement in SNR and frequency response. While the overlap of the plots of the four time series signals 705 still renders them visually indistinguishable from each other, the obscuring noise visible between −65 and −90 decibels in plot 500 is virtually eliminated in plot 700. Further, the shape of the load is more clearly preserved in average 720 than in average 520, and the dynamic range of the average 720 is emphasized, spanning a greater range of decibels than the range of average 520. This improves the utility of average 720 for modeling the operation signature of the system over average 520. Thus, average 720 over the raw frequencies with best inter-correlations represents the optimal frequency response of the bin to the stress load.

Figure 8:
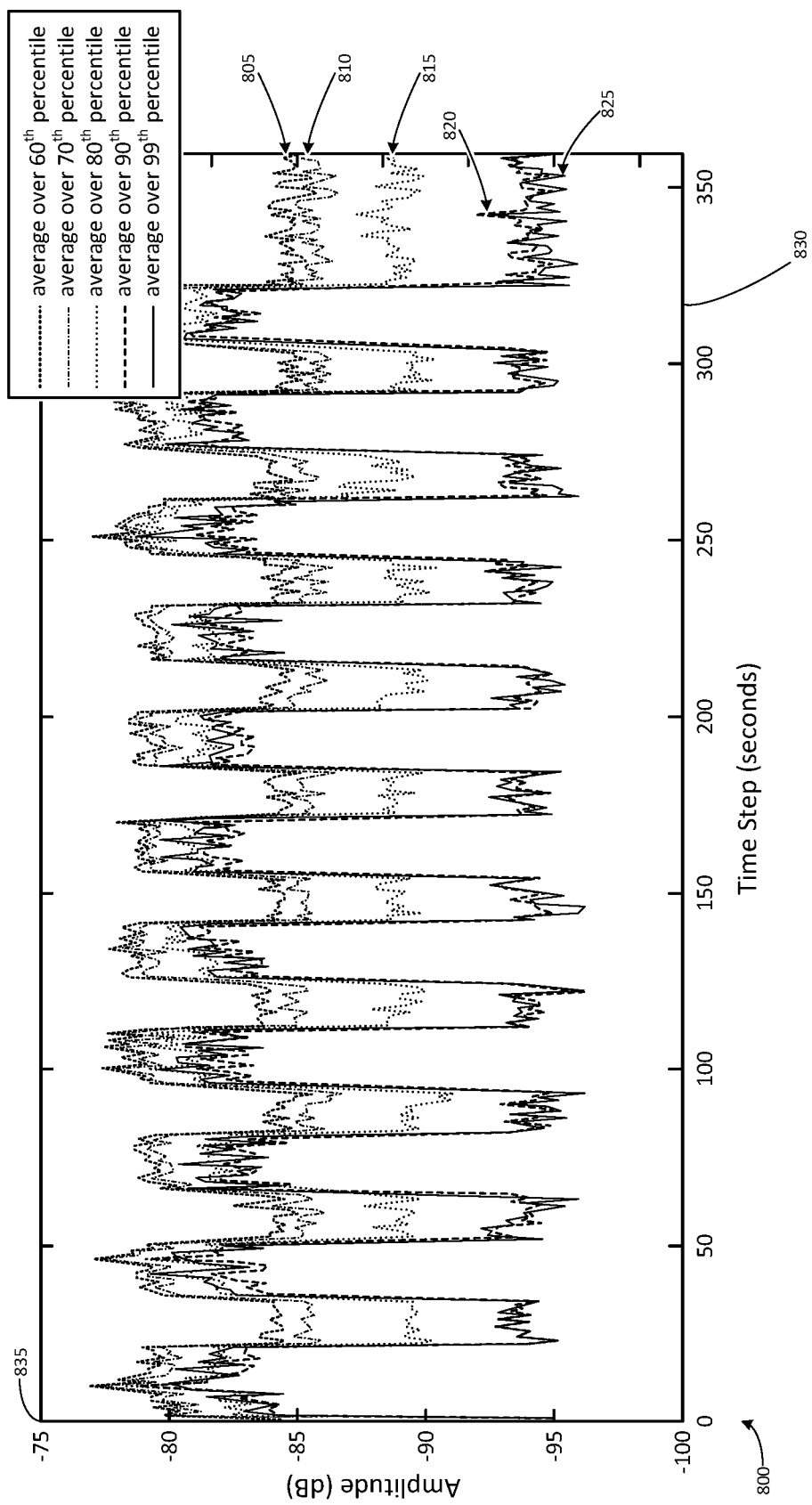
FIG. 8 illustrates a plot of a sensitivity test with different intercorrelation percentile thresholds and the resulting averages at those thresholds.

In one embodiment, the $90^{th}$ percentile frequencies in terms of intercorrelation is used as the threshold to sort out the "best" frequencies for frequency response of a bin to the shape of the load on the device. The $90^{th}$ percentile threshold represents a good balance between capturing the signal dynamic range and having more than one frequency available to represent the bin. But, percentiles other than the $90^{th}$ percentile may also be used. FIG. 8 illustrates a plot 800 of a sensitivity test with different intercorrelation percentile thresholds and the resulting averages at those thresholds. Plot 800 is a comparison of optimal frequency response of a given frequency bin with different percentile thresholds. Plot 800 includes average time series signals for the $60^{th}$ percentile 805, $70^{th}$ percentile 810, $80^{th}$ percentile 815, $90^{th}$ percentile 820, and $99^{th}$ percentile 825 of frequencies in the bin. The average time series signals 805-825 are plotted against time step axis 830 (with units given in seconds) and amplitude axis 835 (with units given in decibels). As is visible on plot 800, beyond the $90^{th}$ percentile, there is little improvement in term of greater dynamic range and clearer shape of stress load. Yet, the likelihood of too few available frequencies to represent the bin goes up when setting the percentile threshold beyond the $90^{th}$.

In one embodiment, a representative time series signal is obtained for each of the frequency bins, for example using method 600. In the example use case of the example server device, there are 100 frequency bins, so 100 time series signals representative of the 100 bins are obtained. The SNR of these signals is then further examined in the frequency domain. A number of top signals with the strongest frequency components (highest peaks) in the spectrogram are selected as frequencies that are indicative of the operative load on the device.

Figure 9:
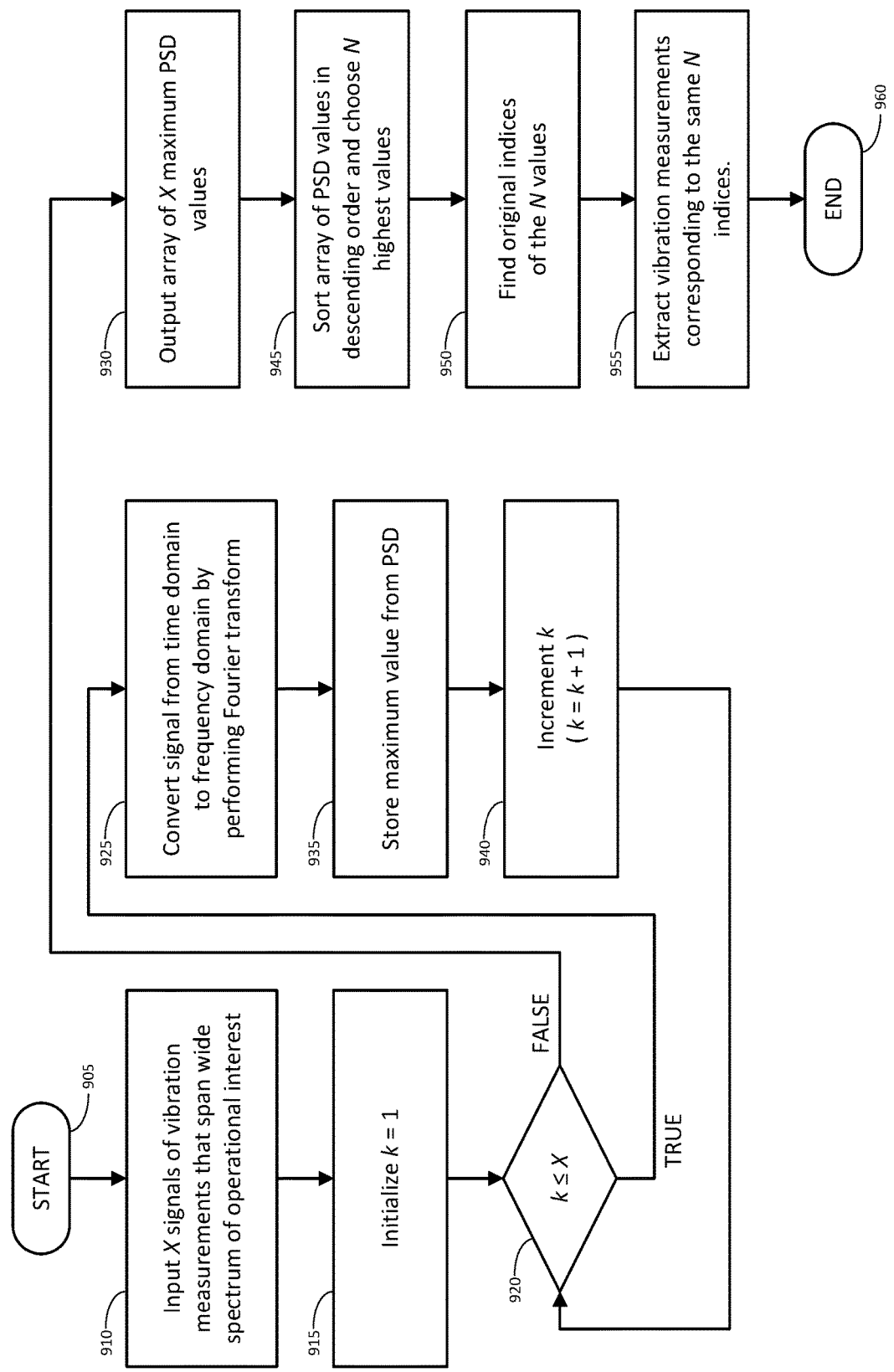
FIG. 9 illustrates one embodiment of a method for identifying frequencies indicative of operational load on a device associated with autonomous discrimination of operation vibration signals.

FIG. 9 illustrates one embodiment of a method 900 for identifying frequencies indicative of operational load on a device associated with autonomous discrimination of operation vibration signals. In one embodiment, the steps of method 900 are performed by PSD generation component 244, maximum PSD determination component 245, bin selection component 246, and signal assignment component 247 of autonomous signal discrimination components 240. The method 900 may be initiated automatically based on various triggers, such as in response to receiving a signal over a network or parsing stored data indicating that (i) a user (or administrator) of time series data service 205 has initiated method 900, (ii) that method 900 is scheduled to be initiated at defined times or time intervals, (iii) a representative signal has been generated for each bin, which representative signals are now ready for discrimination of frequencies indicative of operational load on a device. The method 900 initiates at START block 905 in response to parsing a signal received or stored data retrieved and determining that the signal or stored data indicates that the method 900 should begin. Processing continues to process block 910.

At process block 910, the processor retrieves and inputs X signals of vibration measurements that span a wide spectrum of operational interest. In one embodiment, the processor retrieves from storage and inputs into memory for subsequent processing the X representative time series signals generated by method 600 to represent the X bins. The X representative time series signals cover the full spectrum of operational interest: the bins represented by the time series signals range over the full spectrum of vibrations detected by vibration sensors affixed or attached to a device or system and therefore cover all vibrations due to operational load on the device or system. Process block 910 completes and processing continues at process block 915.

At process block 915, the processor initializes a signal counter k to a value of 1, in a manner substantially similar to the initialization of counters l and j above. The signal counter k is an index number that indicates which representative time series signal (in a range from signal no. 1 to signal no. X) is current signal under consideration in a processing loop shown and described below. Following initialization of signal counter k, process block 915 completes and processing continues at decision block 920.

Decision block 920 begins a processing loop that repeats for each representative time series signal to find a PSD maximum for each bin. At decision block 920, the processor determines whether representative time series signals remain for identification of a PSD maximum, for example by evaluating whether the value of bin counter k is less than or equal to the total number of bins and representative time series signals X in a manner substantially similar to that described for bin counter i above. Where the value of k is less than or equal to X, representative time series signals remain for identification of a PSD maximum. Where the value of k is not less than or equal to X (that is, greater than X), no representative time series signals remain for identification of a PSD maximum. Where the processor has determined that signals remain (X: TRUE), processing at decision block 920 completes and processing continues to process block 925. Where the processor has determined that no signals remain (k≤X: FALSE), processing at decision block 920 completes and processing continues to process block 930.

At process block 925, the processor converts the representative time series signal from time domain to frequency domain by performing a Fourier transform, such as an FFT or DFT. Note that this transform is of a representative time series signal for a single bin, and is not a transform of the entire frequency spectrum. The conversion of the representative time series signal to the frequency domain yields a power spectral density curve for the single bin represented by the representative time series signal. The processor stores the resulting curve for subsequent processing, for example in a data structure associated with the bin. In one embodiment, the PSD curve for the bin is generated as shown and described with reference to process block 320 of method 300. In one embodiment, the steps of process block 925 are performed by PSD generation components 244. Process block 925 then completes and processing continues at process block 935.

At process block 935, the processor identifies and stores a maximum value (or peak value) of the PSD for the bin. In one embodiment, the maximum or peak value of the PSD is identified as shown and described with respect to process block 325 of method 300. The maximum value of the PSD is stored for subsequent processing in association with its respective bin. In one embodiment, the processor stores the maximum value of the PSD by appending it to an array of maximum PSD values. Process block 935 completes, and processing continues at process block 940.

At process block 940, the processor increments the value of the signal counter k by one, for example in a manner substantially similar to the incrementation of counters i and j above. Processing at process block 940 completes and processing returns to decision block 920. Processing continues to loop through blocks 925, 935, and 940 until a maximum value of a PSD is recorded for each of X bins, where the PSD for the bin results from the Fourier transform of the representative time series signal for the bin. Once no representative signals remain for PSD generation and maximum value identification, processing continues from decision block 920 to process block 930.

At process block 930, the processor outputs an array of X maximum PSD values created by repeatedly storing the PSD values at process block 935 of the loop. In one embodiment, the processor stores the array of X maximum PSD values for the X bins for subsequent processing. Process block 930 completes and processing continues at process block 945.

At process block 945, the processor sorts the array of maximum PSD values in descending order, and chooses the N highest values in the array. In one embodiment, the processor sorts the array by executing an appropriate sorting algorithm, such as one of the comparison sorts previously mentioned. In one embodiment, the processor retrieves a value of N previously stored by a user or administrator of the system. In one embodiment, the processor then chooses the top N highest PSD values, and identifies the bins associated with them. In one embodiment, the steps of process blocks 930 and 945 are performed by bin selection components 246. Process block 945 completes and processing continues at process block 950.

At process block 950, the processor finds the original indices of the N values. In one embodiment, the original indices of the N values are the raw frequency time series signals that make up the representative time series signals for the N bins with the highest maximum PSD values. In one embodiment, the processor retrieves the representative time series signals for each of the N bins with the highest maximum PSD values. The processor identifies the raw frequency time series signals in the bin that are combined (averaged) together to produce the representative time series signal in the bin. In one embodiment, the processor stores each of these raw frequencies in association with the N bins, for example in a list or other data structure. These identified frequencies are highly indicative of the operational load of the device, and the processor may automatically assign the average of the vibration signals at these frequencies in the bin (the representative frequency for a top bin) to be operation vibration signals of the device. In one embodiment, the steps of process block 950 are performed by signal assignment components 247. Process block 950 completes and processing continues at process block 955.

At process block 955, the processor extracts vibration measurements corresponding to the indices. In one embodiment, the processor samples vibration amplitude measurements output by the spectrum analyzer at each of the raw frequencies that is a component of an operation vibration signal to generate raw frequency time series signals. The processor then averages these component raw frequency time signals for each bin to create a set of N operation vibration signals. The processor then stores these N operation vibration signals for subsequent processing. Process block 955 completes and processing continues to end block 960, where method 900 completes.

Figure 10:
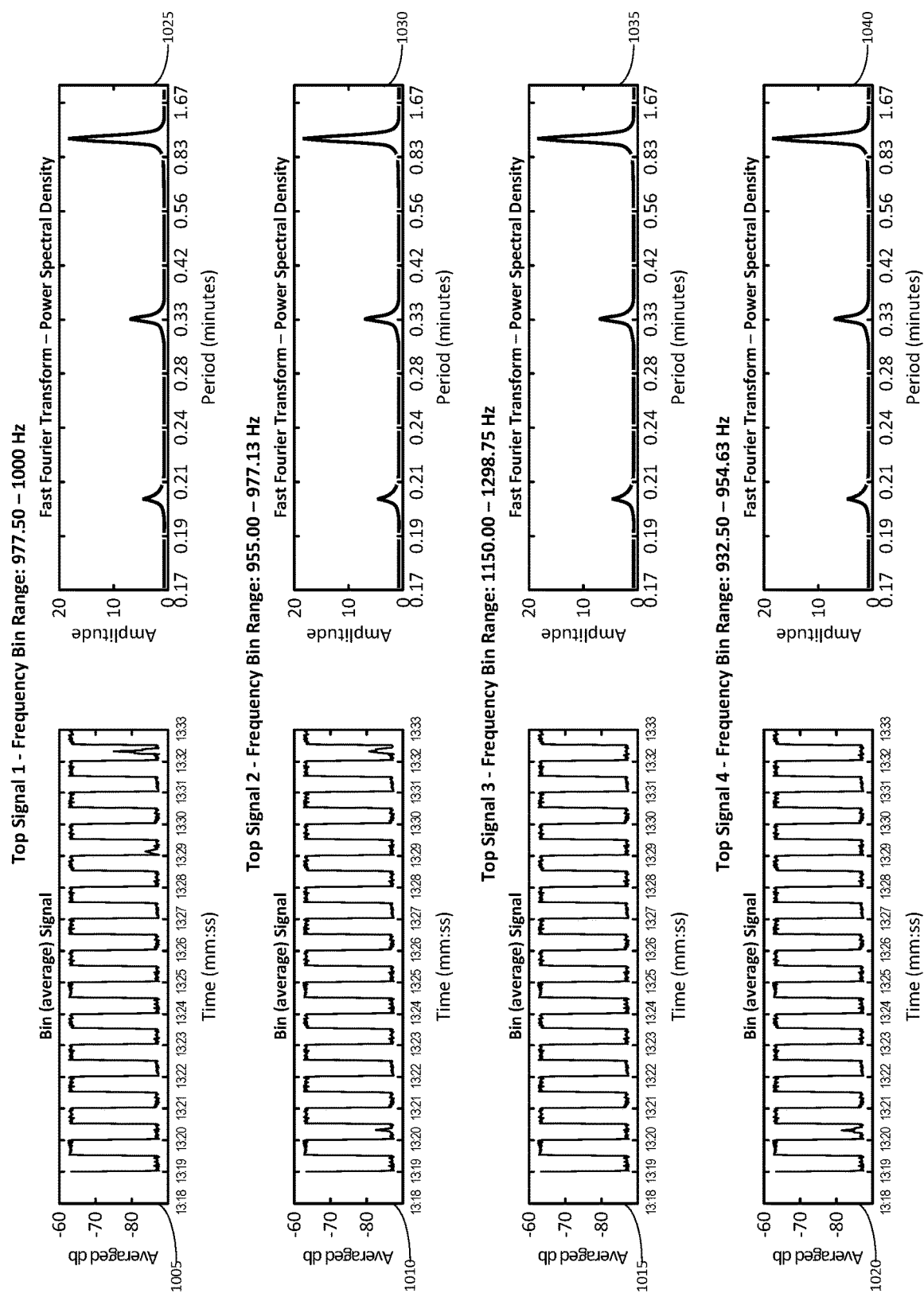
FIG. 10 illustrates top four representative signals of the example deterministic stress load test executed by the example server and their respective frequency domain.

FIG. 10 illustrates top four representative signals 1005, 1010, 1015, 1020 of the example deterministic stress load test executed by the example server and their respective frequency domain PSDs 1025, 1030, 1035, 1040. Depending on the sensitivity requirements of health monitoring for the device or system, 20% of the number of discrete frequency bins is recommended for selecting the top signals. In FIG. 10, the signals derived from the frequency binning characterization may be further examined in the frequency domain. The top 20% signals with tallest peaks in the spectrogram are considered to be the "best" signals that truly reflect the operating signature of the device or system. For a concise illustration, just the top 4 of the top 20 signals in this use case are shown in FIG. 10. In the example case study of the server under deterministic stress load test, the top 20 are selected signals based on the maximum height of the peak in the frequency domain. Each of these signals show a crisp shape of stress load on the server in the time domain, with minimal variabilities, as can be seen in the time domain signal plots 1005, 1010, 1015, and 1020.

—Example Implementation: Automotive—

While the forgoing examples utilized vibration measurements from an example enterprise computing server operated under a deterministic stress load, a second test implementation was conducted to illustrate the robustness of the systems and methods for autonomous discrimination of operation vibration signals described herein. A set of vibration measurements, of an arbitrary asset, in this case an automobile, were taken with a tri-axial accelerometer attached to the hood of the automobile directly above the engine. Measurements were taken while changing the operating conditions over time. Specifically, the car was placed in idle, around 750 rpms, and revved up to around 4000 rpms, periodically at regular intervals so as to include a sizable range of the car operating frequencies in the measurements. The measurements were then binned in the same manner as shown and described with respect to method 600 or process blocks 310 and 315 of method 300.

Figure 11:
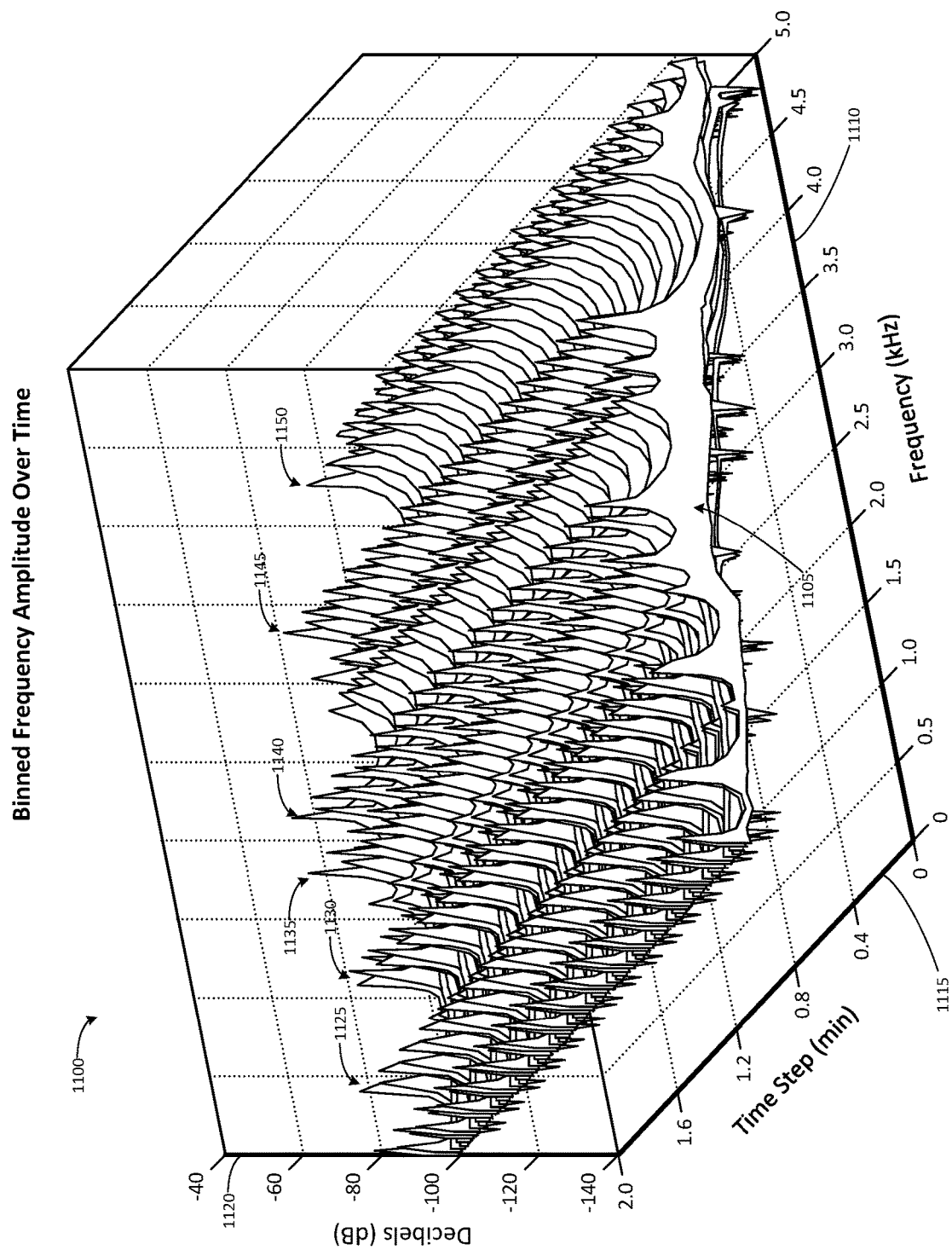
FIG. 11 shows a three-axis plot of the change in frequency for measurements obtained from an automobile.

FIG. 11 shows a three-axis plot 1100 of the change in frequency 1105 for measurements obtained from the automobile. Frequency (measured in kHz) is on the x-axis 1110, time (measured in minutes) is on the y-axis 1115, and power (measured in decibels) is on the z-axis 1120. The frequency bins with higher power output over time are indicative of the nominal operations of the car. The changing load on the car is easily visualized by looking at changing frequencies 1105 over time. Frequency ranges that are demonstrative of the varying workload of the car are visibly prominent, as shown at references 1125-1150. The frequencies with low power and relatively flat behavior are ignored.

Figure 12:
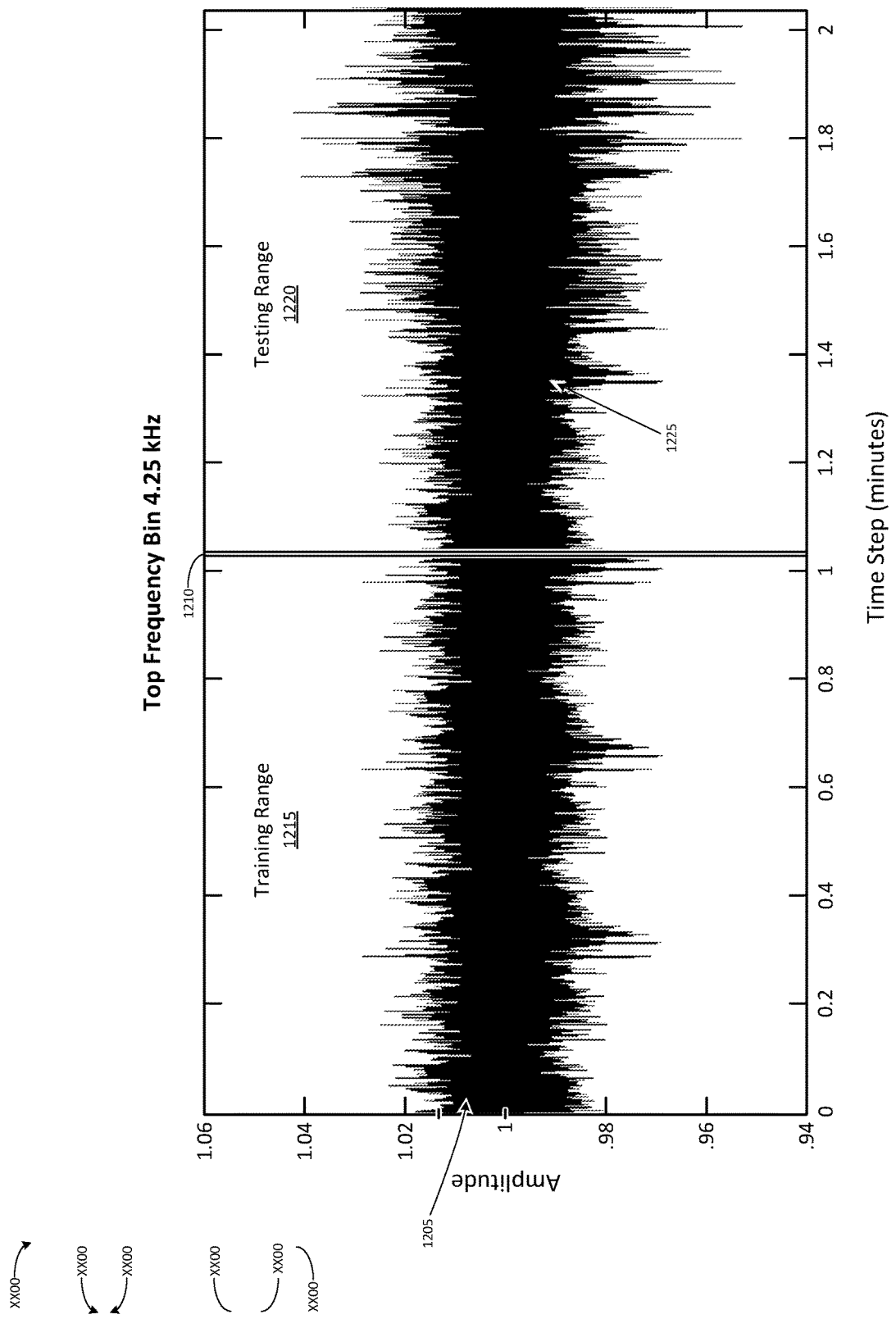
FIG. 12 illustrates a plot of an example time series signal for a top frequency bin of the automobile.

The prominent frequency bins may be automatically identified, for example by executing the method 900 as shown and described with reference to FIG. 9. The time series signals corresponding to those bins may then be extracted and processed by advanced pattern recognition ML algorithms, such as MSET2 or other NLNP algorithms, for anomaly detection. FIG. 12 illustrates a plot 1200 of an example time series signal 1205 for the top frequency bin 1150 of the automobile. This time series signal corresponding to the top frequency bin 1150 may be used to build, configure, and or train a prognostic ML model. All time steps to the left of the dividing line 1210 (training range 1215) are considered training data, whereas the measurements to the right of dividing line 1210 are the testing range 1220. A change in operations was inserted into the measurements in the last 45 seconds (beginning at potential incipience of degradation 1225) by revving the engine outside the original range, 4000 rpms, of the pervious time steps. The change in the signal in the last 30 seconds is visually obvious so it would be also identifiable by a prognostic ML model trained on the data in training range 1215.

—Selected Advantages—

The systems and methods for autonomous discrimination of operation vibration signals described herein make it possible to automatically characterize the vibration frequencies that occur due to operation of a device, where before, such frequencies were not isolable from noise and ambient vibration. The systems and methods for autonomous discrimination of operation vibration signals described herein overcome inherent challenges of vibrational prognostics in systems using accelerometers by automatically identifying the specific narrow frequencies that most closely reflect the energy content associated with the load on the system, and automatically selecting these as the inputs to prognostic ML models used to monitor the system.

The systems and methods for autonomous discrimination of operation vibration signals described herein enable robust vibration-based ML prognostics in all types of mechanical, electromechanical, and thermal-hydraulic flow systems, whether operating at fixed or variable speeds, and whether operating in vibrationally quiet or vibrationally noisy background environments. Identifying the particular operation vibration frequencies enables those frequencies to be monitored by prognostic machine learning models in real-time, allowing real-time alerting to incipient failure. This is due at least in part to the significantly reduced compute cost for ML identification of potential degradation from a few highly indicative frequencies compared with the computationally infeasible ML surveillance of the wide band of frequencies detected by vibration sensors.

The systems and methods for autonomous identification and extraction of those vibration frequencies described herein enable condition-based maintenance—maintenance performed when the need arises—by allowing earlier and more accurate detection of incipient faults. Condition-based maintenance is preferred because time-based maintenance schedules result in having technicians disassemble and check all internal components, including components that are 100% healthy. This is costly (fixing components that are still 100% healthy), and often results in "human induced" maintenance activities when technicians accidentally break things that were operating normally. The systems and methods described herein aid in the ability to proactively identify and fix small defects in devices, avoid catastrophic damage to devices, and apply condition-based maintenance, thereby maximizing up-time availability of devices.

Any software systems used to analyze time series databases for ML prognostics may be improved by implementing embodiments of the systems and methods described herein for autonomous discrimination of operation vibration signals. For example, improved accuracy in anomaly alerting from prognostic ML monitoring of vibration time series information is enabled by implementing autonomous discrimination of vibration signals that correspond to the operating load of a monitored device (as shown and described herein) in any of software systems such as GE PREDIX, Microsoft Azure, Amazon AWS_Sitewise, SAP/Siemens Intelligent Asset Management, or other time series data analysis services.

—Computing Device Embodiment—

Figure 13:
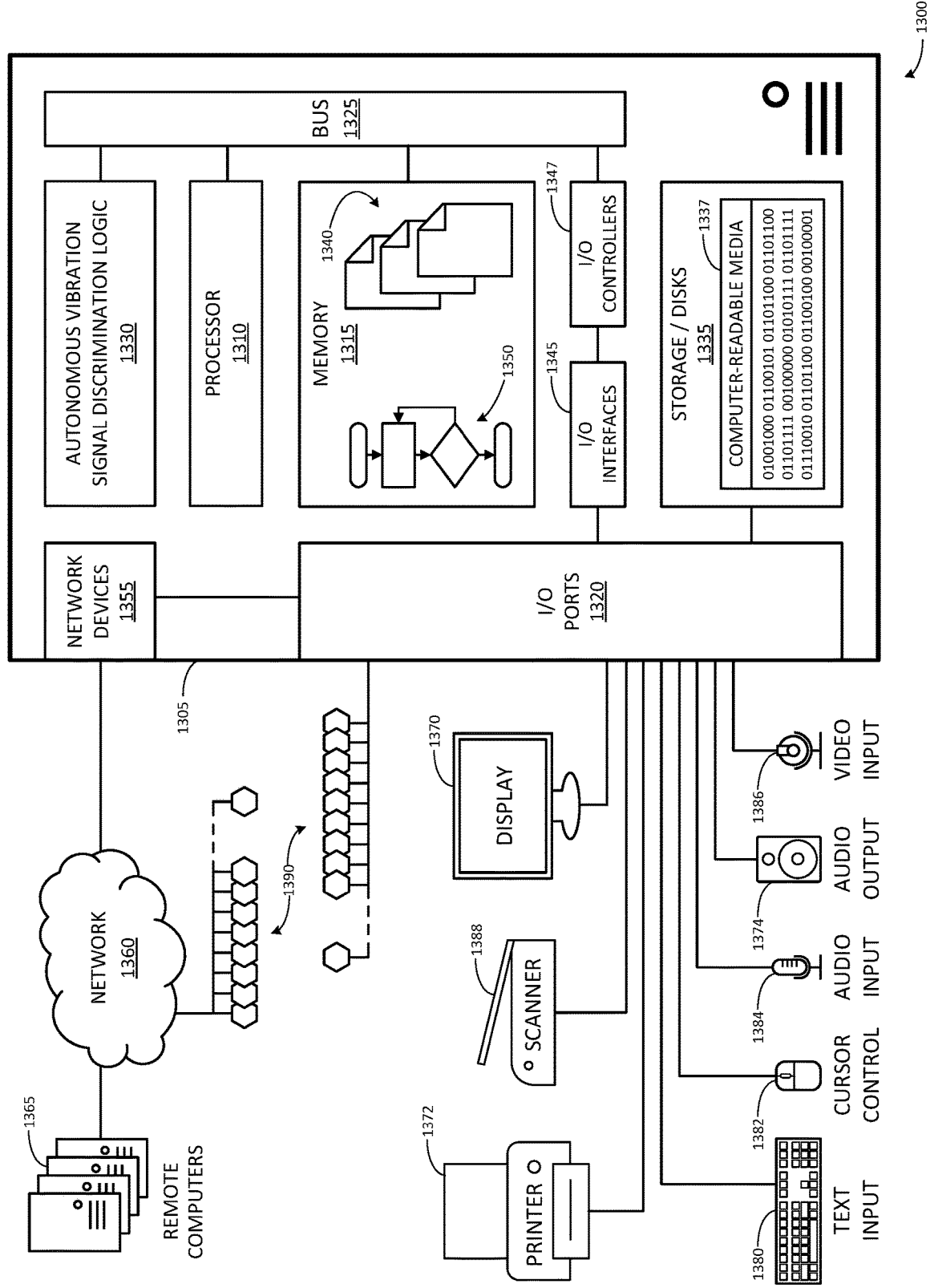
FIG. 13 illustrates an embodiment of a computing system configured with the example systems and/or methods disclosed.

FIG. 13 illustrates an example computing system 1300 that is configured and/or programmed as a special purpose computing device with one or more of the example systems and methods described herein, and/or equivalents. The example computing device may be a computer 1305 that includes a processor 1310, a memory 1315, and input/output ports 1320 operably connected by a bus 1325. In one example, the computer 1305 may include autonomous vibration signal discrimination logic 1330 configured to facilitate autonomous discrimination of operation vibration signals similar to the logic, systems, and methods shown and described with reference to FIGS. 1-12. In different examples, the logic 1330 may be implemented in hardware, a non-transitory computer-readable medium with stored instructions 1337, firmware, and/or combinations thereof. While the logic 1330 is illustrated as a hardware component attached to the bus 1325, it is to be appreciated that in other embodiments, the logic 1330 could be implemented in the processor 1310, stored in memory 1315, or stored in disk 1335.

In one embodiment, logic 1330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to autonomously discriminate operation vibration signals. The means may also be implemented as stored computer executable instructions that are presented to computer 1305 as data 1340 that are temporarily stored in memory 1315 and then executed by processor 1310.

Logic 1330 may also provide means (e.g., hardware, non-transitory computer-readable medium that stores executable instructions, firmware) for performing autonomous discrimination of operation vibration signals.

Generally describing an example configuration of the computer 905, the processor 1310 may be a variety of various processors including dual microprocessor and other multi-processor architectures. A memory 1315 may include volatile memory and/or non-volatile memory. Non-volatile memory may include, for example, ROM, PROM, and so on. Volatile memory may include, for example, RAM, SRAM, DRAM, and so on.

A storage disk 1335 may be operably connected to the computer 905 through, for example, an input/output (I/O) interface (e.g., card, device) 1345 and an input/output port 1320 that are controlled by at least an input/output (I/O) controller 1347. The disk 1335 may be, for example, a magnetic disk drive, a solid-state disk drive, a floppy disk drive, a tape drive, a Zip drive, a flash memory card, a memory stick, and so on. Furthermore, the disk 1335 may be a CD-ROM drive, a CD-R drive, a CD-RW drive, a DVD ROM, and so on. The memory 1315 can store a process 1350 and/or a data 1340, for example. The disk 1335 and/or the memory 1315 can store an operating system that controls and allocates resources of the computer 1305.

The computer 1305 may interact with, control, and/or be controlled by input/output (I/O) devices via the input/output (I/O) controller 1347, the I/O interfaces 1345 and the input/output ports 1320. The input/output devices may include one or more displays 1370, printers 1372 (such as inkjet, laser, or 3D printers), and audio output devices 1374 (such as speakers or headphones), text input devices 1380 (such as keyboards), a pointing and selection device 1382 (such as mice, trackballs, touchpads, touch screens, joysticks, pointing sticks, stylus mice), audio input devices 1384 (such as microphones), video input devices 1386 (such as video and still cameras), video cards (not shown), disk 1335, network devices 1355, sensors (not shown), and so on. The input/output ports 1320 may include, for example, serial ports, parallel ports, and USB ports. In one embodiment, the computer may be connected to vibration sensors 1390 through I/O ports 1310 or networks 1360 in order to receive broad spectrum vibration information from monitored devices and systems.

The computer 1305 can operate in a network environment and thus may be connected to the network devices 1355 via the I/O interfaces 1345, and/or the I/O ports 1320. Through the network devices 1355, the computer 1305 may interact with a network 1360. Through the network 1360, the computer 1305 may be logically connected to remote computers 1365, and to vibration sensors of the remote computers. Networks with which the computer 1305 may interact include, but are not limited to, a LAN, a WAN, and other networks.

No action or function described or claimed herein is performed by the human mind. An interpretation that any action or function can be performed in the human mind is inconsistent and contrary to this disclosure.

—Software Module Embodiments—

In general, software instructions are designed to be executed by one or more suitably programmed processor accessing memory. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, time series data service 205 is a computing/data processing system including an application or collection of distributed applications for enterprise organizations. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system is a centralized server-side application that provides at least one or more of the functions disclosed herein and a graphical user interface to access and operate them, and that is accessed by many users via computing devices/terminals communicating with the present computing system (functioning as the server) over a computer network.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following paragraphs include definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AAKR: autoassociative kernel regression.

API: application programming interface.

ASIC: application specific integrated circuit.
CD: compact disk.
CD-R: CD recordable.
CD-RW: CD rewriteable.
CPU: central processing unit.
DAQ: data acquisition unit.
DFT: discrete Fourier transform.
DIMM: dual in-line memory modules.
DNB: departure-from-nucleate boiling.
DRAM: dynamic RAM.
DVD: digital versatile disk and/or digital video disk.
EMI: electromagnetic interference.
EEPROM: electrically erasable PROM.
EPROM: erasable PROM.
FFT: fast Fourier transform.
FIV: flow-induced vibration.
GPU: graphics processing unit.
GUI: graphical user interface.
HDD: hard drive disk.
HPC: high performance computing.
HTTP: hypertext transfer protocol.
I/O: input/output.
IAAS: infrastructure as a service.
IT: information technology.
JSON: JavaScript object notation.
LAN: local area network.
ML: machine learning.
MSET: multivariate state estimation technique.
MSET2: Oracle's proprietary multivariate state estimation technique implementation.
NAS: network-attached storage.
NLNP: nonlinear nonparametric.
NN: neural network.
NOSQL: not-only SQL.
OS: operating system.
PAAS: platform as a service.
PCI: peripheral component interconnect.
PCIE: PCI express.
PLC: programmable logic controller.
PROM: programmable ROM.
PSD: power spectral density.
PWM: pulse width modulation.
RAM: random access memory.
REST: representational state transfer.
ROM: read only memory.
RPM: rotations per minute.
RTU: remote terminal unit.
SAAS: software as a service.
SOAP: simple object access protocol.
SQL: structured query language.
SRAM: synchronous RAM.
SSD: solid-state drive.
SVM: support vector machine.
TCP/IP: transmission control protocol/Internet protocol.
USB: universal serial bus.
VRS: vibration resonance spectrometry.
WAN: wide area network.
XML: extensible markup language.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

The invention claimed is:

1. A computer-implemented method for autonomous discrimination of operation vibration signals, the method comprising:
    partitioning a frequency spectrum of output into a plurality of discrete frequency bins, wherein the output is collected from one or more vibration sensors monitoring a reference device;
    generating a representative time series signal for each bin while the reference device is operated to vary the workload of the reference device in a deterministic stress load test pattern that repeats at an interval of time;
    generating a power spectral density for each frequency bin by converting each representative time series signal from the time domain to the frequency domain;
    determining a maximum power spectral density value for each frequency bin and a peak frequency value for each frequency bin at which the maximum power spectral density value occurs;
    selecting a subset of the frequency bins that have maximum power spectral density values exceeding a first threshold;
    assigning the representative time series signals from the selected subset of frequency bins as operation vibration signals indicative of operational load on the reference device; and
    configuring a machine learning model to detect an anomaly based on at least the operation vibration signals.

2. The computer-implemented method of claim 1, further comprising:
    computing correlation coefficients between each frequency in a first bin and each other frequency in the first bin;
    computing an intercorrelation score for each frequency in the first bin from the correlation coefficients for the frequency;
    identifying a set of highly-intercorrelated frequencies in the first bin, wherein the highly-intercorrelated frequencies have intercorrelation scores exceeding a second threshold; and
    generating the representative time series signal for the first bin from an average of time series values for each of the set of highly-intercorrelated frequencies.

3. The computer-implemented method of claim 2, wherein the second threshold is having an intercorrelation score in at least a 90th percentile of the intercorrelation scores for the first bin.

4. The computer-implemented method of claim 1,
    wherein configuring the machine learning model further comprises training the machine learning model with the operation vibration signals collected during a training period of normal operation of the reference device; and
    wherein the method of claim 1 further comprises:
        monitoring operation vibration signals of a target device with the trained model during a surveillance period of operation to detect the anomaly; and
        transmitting a predictive maintenance alert in response to detection of the anomaly in one or more of the operation vibration signals of the target device.

5. The computer-implemented method of claim 4, wherein the machine learning model is a non-linear non-parametric regression model or a multivariate state estimation technique model.

6. The computer-implemented method of claim 1, wherein the deterministic stress load test pattern is one of a sinusoidal stress load, a stress load regularly cycling between on and off states, a stress load regularly cycling between high and low states, and a stress load regularly cycling between high and idle states.

7. The computer-implemented method of claim 1, wherein the first threshold is having a maximum power spectral density value in at least an 80th percentile of the maximum power spectral density values of all bins.

8. A non-transitory computer-readable medium that includes stored thereon computer-executable instructions that when executed by at least a processor of a computer cause the computer to:
    partition a frequency spectrum of output a frequency spectrum of output into a plurality of discrete frequency bins, wherein the output is collected from one or more vibration sensors monitoring a reference device;
    generate a representative time series signal for each frequency bin while the reference device is operated in a deterministic stress load test pattern;
    generate a power spectral density for each frequency bin by converting each representative time series signal from the time domain to the frequency domain;
    determine a maximum power spectral density value for each frequency bin and a peak frequency value for each frequency bin at which the maximum power spectral density value occurs;
    select a subset of the frequency bins that have maximum power spectral density values exceeding a threshold;
    assign the representative time series signals from the selected subset of frequency bins as operation vibration signals indicative of operational load on the reference device; and
    configure a machine learning model to detect an anomaly based on at least the operation vibration signals.

9. The non-transitory computer-readable medium of claim 8, wherein the instructions further cause the computer to:
compute correlation coefficients between each frequency in a first bin and each other frequency in the first bin;
compute an intercorrelation score for each frequency in the first bin from the correlation coefficients for the frequency;
identify a set of highly-intercorrelated frequencies in the first bin, wherein the highly-intercorrelated frequencies have intercorrelation scores exceeding a second threshold; and
generate the representative time series signal for the first bin from an average of time series values for each of the set of highly-intercorrelated frequencies.

10. The non-transitory computer-readable medium of claim 9, wherein the second threshold is having an intercorrelation score in at least a 90th percentile of the intercorrelation scores for the first bin.

11. The non-transitory computer-readable medium of claim 8,
wherein the instructions to configure the machine learning model further cause the computer to train the machine learning model with the operation vibration signals collected during a training period of normal operation of the reference device; and
wherein the instructions further cause the computer to:
monitor operation vibration signals of a target device with the trained model during a surveillance period of operation to detect vibration anomalies; and
transmit a predictive maintenance alert in response to detection of a vibration anomaly in one or more of the operation vibration signals of the target device.

12. The non-transitory computer-readable medium of claim 11, wherein the machine learning model is a non-linear non-parametric regression model or a multivariate state estimation technique model.

13. The non-transitory computer-readable medium of claim 8, wherein the deterministic stress load test pattern is one of a sinusoidal stress load, a stress load regularly cycling between on and off states, a stress load regularly cycling between high and low states, and a stress load regularly cycling between high and idle states.

14. The non-transitory computer-readable medium of claim 8, wherein the first threshold is having a maximum power spectral density value in at least an 80th percentile of the maximum power spectral density values of all bins.

15. A computing system comprising:
a processor;
a memory operably connected to the processor;
a non-transitory computer-readable medium operably connected to the processor and memory and storing computer-executable instructions for that when executed by at least a processor of the computing system cause the computing system to:
partition a frequency spectrum of output a frequency spectrum of output into a plurality of discrete bins, wherein the output is collected from one or more vibration sensors monitoring a reference device;
generate a representative time series signal for each bin while the reference device is operated in a deterministic stress load test pattern that repeats at an interval of time;
generate a power spectral density for each bin by converting each representative time series signal from the time domain to the frequency domain;
determine a maximum power spectral density value for each bin and a peak frequency value for each bin at which the maximum power spectral density value occurs;
select a subset of the bins that have maximum power spectral density values exceeding a threshold;
assign the representative time series signals from the selected subset of bins as operation vibration signals indicative of operational load on the reference device; and
configure a machine learning model based on at least the operation vibration signals.

16. The computing system of claim 15, wherein the instructions further cause the computing system to:
compute correlation coefficients between each frequency in a first bin and each other frequency in the first bin;
compute an intercorrelation score for each frequency in the first bin from the correlation coefficients for the frequency;
identify a set of highly-intercorrelated frequencies in the first bin, wherein the highly-intercorrelated frequencies have intercorrelation scores exceeding a second threshold; and
generate the representative time series signal for the first bin from an average of time series values for each of the set of highly-intercorrelated frequencies.

17. The computing system of claim 16, wherein the second threshold is having an intercorrelation score in at least a 90th percentile of the intercorrelation scores for the first bin.

18. The computing system of claim 15,
wherein the machine learning model is a non-linear non-parametric regression model or a multivariate state estimation technique model;
wherein the instructions to configure the machine learning model further cause the computing system to train the machine learning model with the operation vibration signals collected during a training period of normal operation of the reference device; and
wherein the instructions further cause the computing system to:
monitor operation vibration signals of a target device with the trained model during a surveillance period of operation to detect vibration anomalies; and
transmit a predictive maintenance alert in response to detection of a vibration anomaly in one or more of the operation vibration signals of the target device.

19. The computing system of claim 15, wherein the deterministic stress load test pattern is one of a sinusoidal stress load, a stress load regularly cycling between on and off states, a stress load regularly cycling between high and low states, and a stress load regularly cycling between high and idle states.

20. The computing system of claim 15, wherein the first threshold is having a maximum power spectral density value in at least an $80^{th}$ percentile of the maximum power spectral density values of all bins.

* * * * *

UNITED STATES PATENT AND TRADEMARK OFFICE
CERTIFICATE OF CORRECTION

PATENT NO. : 11,740,122 B2
APPLICATION NO. : 17/506200
DATED : August 29, 2023
INVENTOR(S) : Liu et al.

It is certified that error appears in the above-identified patent and that said Letters Patent is hereby corrected as shown below:

On the Title Page

On page 2, Column 2 under Other Publications, Line 6, delete "Amsterdan," and insert -- Amsterdam, --, therefor.

On page 2, Column 2 under Other Publications, Line 22, delete "Kronisburg" and insert -- Kronsberg --, therefor.

In the Specification

In Column 3, Line 24, delete "Area" and insert -- area --, therefor.

In Column 22, Line 35, delete "counters l" and insert -- counters i --, therefor.

In Column 22, Line 56, delete "(X:" and insert -- ($k \leq X$: --, therefor.

In Column 25, Line 14, delete "and or" and insert -- and/or --, therefor.

In the Claims

In Column 32, Line 14, in Claim 3, delete "90th" and insert -- $90^{th}$ --, therefor.

In Column 32, Line 40, in Claim 7, delete "80th" and insert -- $80^{th}$ --, therefor.

In Column 32, Line 46, in Claim 8, after "partition" delete "a frequency spectrum of output", therefor.

In Column 33, Line 17, in Claim 10, delete "90th" and insert -- $90^{th}$ --, therefor.

In Column 33, Line 44 (Approx.), in Claim 14, delete "80th" and insert -- $80^{th}$ --, therefor.

Signed and Sealed this
Eighteenth Day of June, 2024

Katherine Kelly Vidal
*Director of the United States Patent and Trademark Office*

In Column 33, Line 55, in Claim 15, after "partition" delete "a frequency spectrum of output", therefor.

In Column 34, Line 32, in Claim 17, delete "90th" and insert -- $90^{th}$ --, therefor.